(12) United States Patent
Jeon

(10) Patent No.: US 7,365,562 B2
(45) Date of Patent: Apr. 29, 2008

(54) DISPLAY DEVICE AND METHOD OF TESTING SENSING UNIT THEREOF

(75) Inventor: Jin Jeon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/616,389

(22) Filed: Dec. 27, 2006

(65) Prior Publication Data

US 2007/0252614 A1    Nov. 1, 2007

(30) Foreign Application Priority Data

Feb. 20, 2006    (KR) ................ 10-2006-0016122

(51) Int. Cl.
G01R 31/00    (2006.01)
G01R 31/26    (2006.01)

(52) U.S. Cl. .................. 324/770; 324/765; 324/769

(58) Field of Classification Search ............. 324/770, 324/765, 769
See application file for complete search history.

(56) References Cited

U.S. PATENT DOCUMENTS

| | | | |
|---|---|---|---|
| 6,781,642 B2 | 8/2004 | Nakanishi et al. | |
| 6,784,862 B2* | 8/2004 | Kodate et al. | 345/92 |
| 6,876,355 B1 | 4/2005 | Ahn et al. | |
| 7,265,572 B2* | 9/2007 | Osada | 324/770 |
| 7,274,352 B2* | 9/2007 | Yu | 345/100 |
| 2004/0239598 A1* | 12/2004 | Koyama | 345/76 |
| 2006/0284646 A1* | 12/2006 | Shimizume et al. | 324/770 |

FOREIGN PATENT DOCUMENTS

| | | |
|---|---|---|
| JP | 2000311060 | 11/2000 |
| JP | 2001042296 | 2/2001 |
| JP | 2002022789 | 1/2002 |
| KR | 1020040042653 | 5/2004 |
| KR | 1020040095071 | 11/2004 |
| KR | 1020050021080 | 3/2005 |
| KR | 1020050034107 | 4/2005 |
| KR | 1020050038443 | 4/2005 |

* cited by examiner

*Primary Examiner*—Benny Q. Tieu
*Assistant Examiner*—Karen M Kusumakar
(74) *Attorney, Agent, or Firm*—Cantor Colburn LLP

(57) ABSTRACT

A display device includes first and second display signal lines, pixels, first and second sensing signal lines, first through fourth test lines for transmitting first through fourth test signals, a first switching element connected to the first and second test lines, and the first sensing signal line, second switching elements connected to the first switching element, the second test line, and a subset of first display signal lines, a third switching element connected to the third and fourth test lines, and the second sensing signal line, and fourth switching elements connected to the third switching element, the fourth test line, and a subset of second display signal lines.

20 Claims, 18 Drawing Sheets

DISPLAY DEVICE AND METHOD OF TESTING SENSING UNIT THEREOF

This application claims priority to Korean Patent Application No. 10-2006-0016122, filed on Feb. 20, 2006 and all the benefits accruing therefrom under 35 U.S.C. §119, and the contents of which in its entirety are herein incorporated by reference.

BACKGROUND OF THE INVENTION (a) Field of the Invention

The present invention relates to a display device and a method of testing a sensing unit of the display device. More particularly, the present invention relates to a display device having a sensing unit and a method of testing the sensing unit in an easy manner.

(b) Description of the Related Art

A general liquid crystal display ("LCD") of a display device includes two display panels having pixel electrodes and a common electrode, and a liquid crystal layer having dielectric anisotropy interposed between the two display panels.

The pixel electrodes are arranged in a matrix form. Further, the pixel electrodes are connected to switching elements such as thin film transistors ("TFTs"), and are sequentially supplied with an image data voltage.

The common electrode is formed over the entire surface of a display panel, and is supplied with a common voltage. In terms of a circuit configuration, a pixel electrode, a common electrode, and a liquid crystal layer interposed there between form a liquid crystal capacitor. The liquid crystal capacitor is a basic unit for constituting a pixel along with a switching element connected thereto.

In the LCD, an electric field is generated in the liquid crystal layer while a voltage is supplied to the two electrodes. By controlling intensity of the electric field, the transmittance of light passing through the liquid crystal layer is regulated, thereby obtaining a desired image.

A touch screen panel is defined as a device in which a picture or a drawing is written or drawn by bringing a finger or a pen into contact with a screen, or a desired command is executed in a machine such as a computer by executing an icon. The LCD having a touch screen panel attached thereon can recognize not only whether a user's finger or a touch pen comes in contact with the screen, but also contact position information.

During manufacture, a visual inspection ("VI") is carried out so as to test a sensing unit embedded in the LCD and a signal line or the like connected to the sensing unit. However, since an additional test device is required for this, there are costs associated therewith, and the test operation is complex.

BRIEF SUMMARY OF THE INVENTION

The present invention provides a method of testing a sensing unit in an easy manner.

The present invention also provides a display device embedding a sensing unit and having a low defect rate.

According to exemplary embodiments of the present invention, a display device includes a plurality of first display signal lines, a plurality of second display signal lines crossing the first display signal lines, a plurality of pixels each respectively connected to one of the first display signal lines and one of the second display signal lines, a plurality of first sensing signal lines, each respectively formed substantially parallel to a subset of the first display signal lines, each subset of first display signal lines forming a first display signal group, a plurality of second sensing signal lines, each respectively formed substantially parallel to a subset of the second display signal lines, each subset of second display signal lines forming a second display signal group, a plurality of first sensing units connected to the first sensing signal lines, a plurality of second sensing units connected to the second sensing signal lines, a plurality of first test circuits, each respectively connected to one of the first sensing signal lines and a corresponding one of the first display signal groups, the first test circuits supplied with first and second test signals, the first test circuits testing a state of the first sensing units by changing luminance of the pixels according to the state of the first sensing units, and a plurality of second test circuits, each respectively connected to one of the second sensing signal lines and a corresponding one of the second display signal groups, the second test circuits supplied with third and fourth test signals, the second test circuits testing a state of the second sensing units by determining whether or not the pixels will operate according to the state of the second sensing units.

Each of the first test circuits may include a plurality of first switching elements respectively connected to one of the first display signal line groups, and of which a operation status changes in response to the first test signals, and a second switching element connected to the plurality of first switching elements and one of the first sensing signal lines, the second switching element operating in response to the first test signals, and supplying a voltage of the second test signal to a pixel connected to the first display signal line group connected to the plurality of first switching elements.

In addition, each of the second test circuits may include a plurality of third switching elements respectively connected to one of the second display signal line groups, and of which an operation status changes in response to the third test signal, and a fourth switching element connected to the plurality of third switching elements and one of the second sensing signal lines, the fourth switching element operating in response to the third test signals, and supplying a voltage of the fourth test signal to a pixel connected to the second display signal line group connected to the plurality of third switching elements.

In addition, the first and third test signals may be gate-on voltages, and the second test signal may be a data voltage presenting a black gray. The fourth test signal may be a gate-on voltage.

The first and second test circuits may be formed in an edge region of the display device. The first and second sensing units may be pressure sensors.

Other exemplary embodiments of the present invention provide a display device including a plurality of first display signal lines, a plurality of second display signal lines crossing the first display signal lines, a plurality of pixels each respectively connected to one of the first display signal lines and one of the second display signal lines, a plurality of first sensing signal lines, each respectively formed substantially parallel to a subset of the first display signal lines, a plurality of second sensing signal lines, each respectively formed substantially parallel to a subset of the second display signal lines, a first test line spaced apart from a pixel, and transmitting a first test signal, a second test line spaced apart from the first test line, and transmitting a second test signal, a first switching element connected to the first test line, the second test line, and one of the first sensing signal lines, a plurality of second switching elements connected to one subset of the first display signal lines adjacent to the first switching element, the second test line, and the first sensing signal line connected to the first switching element, a third test line spaced apart from the pixel, and transmitting a third test signal, a fourth test line spaced apart from the third test line, and transmitting a fourth test signal, a third switching element connected to the third test line, the fourth test line, and one of the second sensing signal lines, and a plurality of fourth switching elements connected to one subset of the second display signal lines adjacent to the third switching element, the fourth test line, and the second sensing signal line connected to the third switching element.

The display device may further include a sensing unit connected to each of the first and second sensing signal lines, wherein each sensing unit may be a pressure sensor.

Pixels, corresponding to a sensing unit in an abnormal state, may present a gray corresponding to a magnitude of a voltage different from a magnitude of a voltage of the first test signal.

The first and second test lines may be formed within a same layer of the display device as the second display signal lines and the third and fourth test lines may be formed within a same layer of the display device as the first display signal lines.

In yet other exemplary embodiments of the present invention, a method of testing a sensing unit of a display device is provided where the display device includes a plurality of first display signal lines, a plurality of second display signal lines, a plurality of pixels each respectively connected to one of first display signal lines and one of the second display signal lines, at least one first sensing signal line respectively formed substantially parallel to a subset of the first display signal lines, at least one second sensing signal line respectively formed substantially parallel to a subset of the second display signal lines, a first test line, a second test line, a first switching element of which an input terminal is connected to the first test line, a control terminal is connected to the second test line, and an output terminal is connected to one of the at least one first sensing signal lines, a plurality of second switching elements of which input terminals are connected to the first switching element, control terminals are connected to the second test line, and output terminals are respectively connected to one subset of first display signal lines adjacent to the first sensing signal line connected to the first switching element, a third test line, a fourth test line, a third switching element of which an input terminal is connected to the third test line, a control terminal is connected to the fourth test line, and an output terminal is connected to at least one of the second sensing signal lines, and a plurality of fourth switching elements of which input terminals are connected to the third switching element, control terminals are connected to the fourth test line, and output terminals are respectively connected to one subset of second display signal lines adjacent to the second sensing signal line connected to the third switching element. The method includes supplying a first test signal when first to second switching elements are turned on by supplying the first test signal having a first magnitude to the first test line, and supplying a second test signal having a second magnitude to the second test line, changing a state of the second test signal to a third magnitude that is less than the second magnitude, supplying a fourth test signal to a corresponding pixel when the third and fourth switching elements are turned on by supplying a third test signal having a fourth magnitude to the third test line, and supplying the fourth test signal having the second magnitude to the fourth test line, and changing a state of the fourth test signal from the second magnitude to the third magnitude.

The second magnitude may be equal to the magnitude of a gate-on voltage. The third magnitude may be equal to the magnitude of a gate-off voltage. The first magnitude may be equal to a data voltage presenting a black gray, and the fourth magnitude may be equal to the magnitude of the gate-on voltage.

The method may further include supplying the first test signal to the first display signal lines via the second switching elements, and supplying the third test signal to the second display signal lines via the fourth switching element.

The display may further include a sensing unit connected to each of the first and second sensing signal lines, and the method may further include determining whether a sensing unit is in an abnormal state by visually detecting whether any corresponding pixels present a gray corresponding to a magnitude of a voltage different from the first magnitude.

BRIEF DESCRIPTION OF THE DRAWINGS

The above and other features and advantages of the present invention will become more apparent by describing exemplary embodiments thereof with reference to the accompanying drawings, in which.

DETAILED DESCRIPTION OF THE INVENTION

Figure 1:
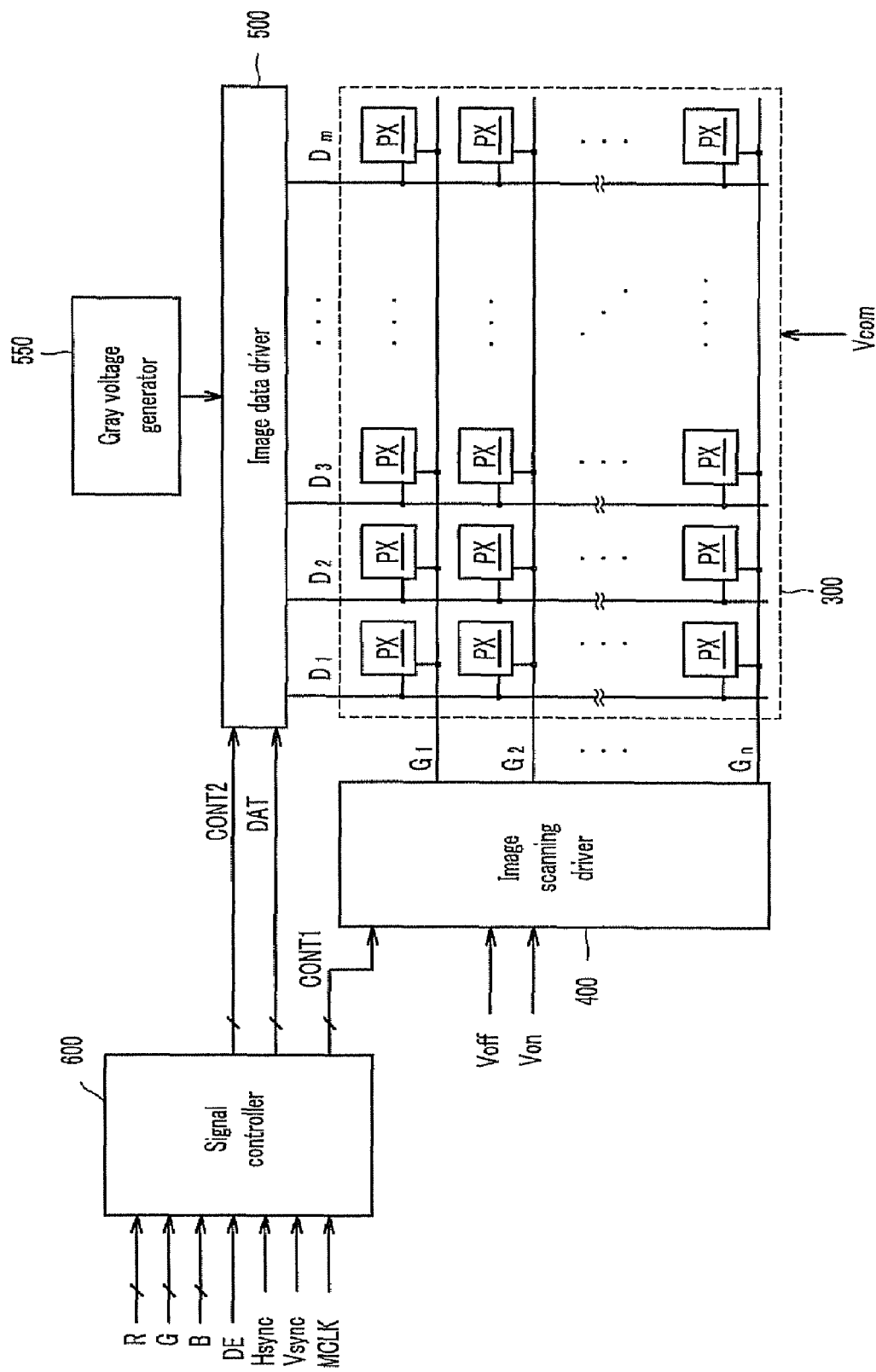
FIG. 1 is a block diagram of an exemplary liquid crystal display ("LCD") according to an exemplary embodiment of the present invention, focusing on pixels.

The present invention will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Now, a liquid crystal display ("LCD") according to an exemplary embodiment of the present invention will be described in detail with reference to the accompanying drawings.

Figure 2:
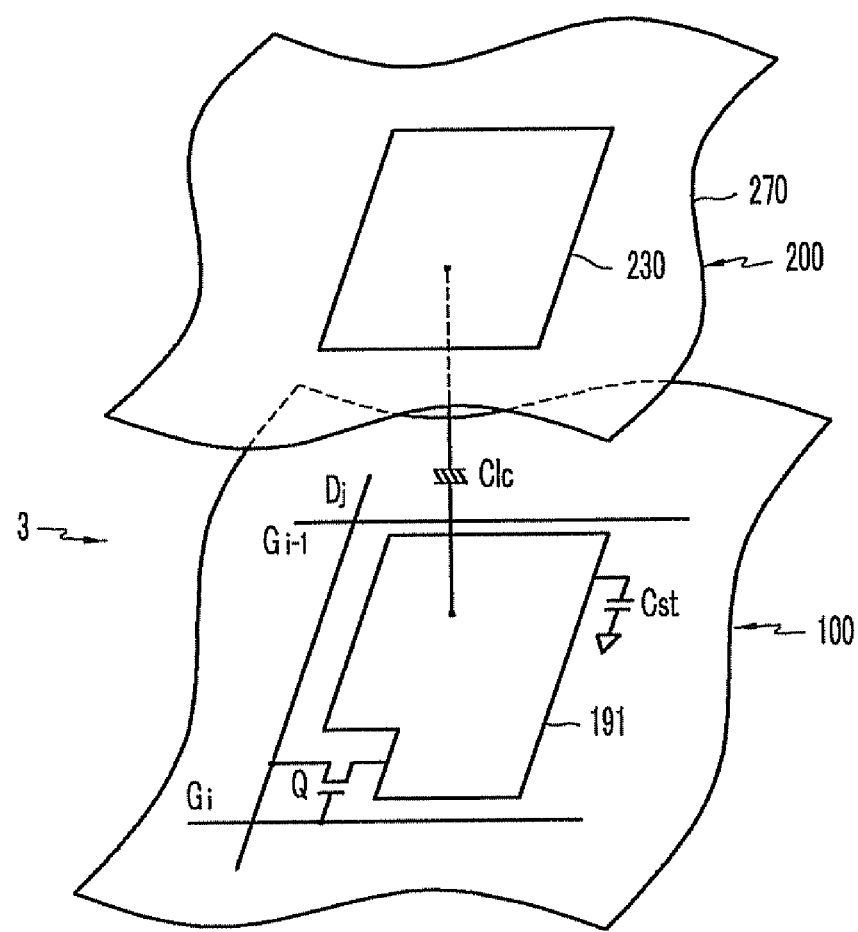
FIG. 2 is an equivalent circuit diagram of one exemplary pixel of an exemplary LCD according to an exemplary embodiment of the present invention.
Figure 3:
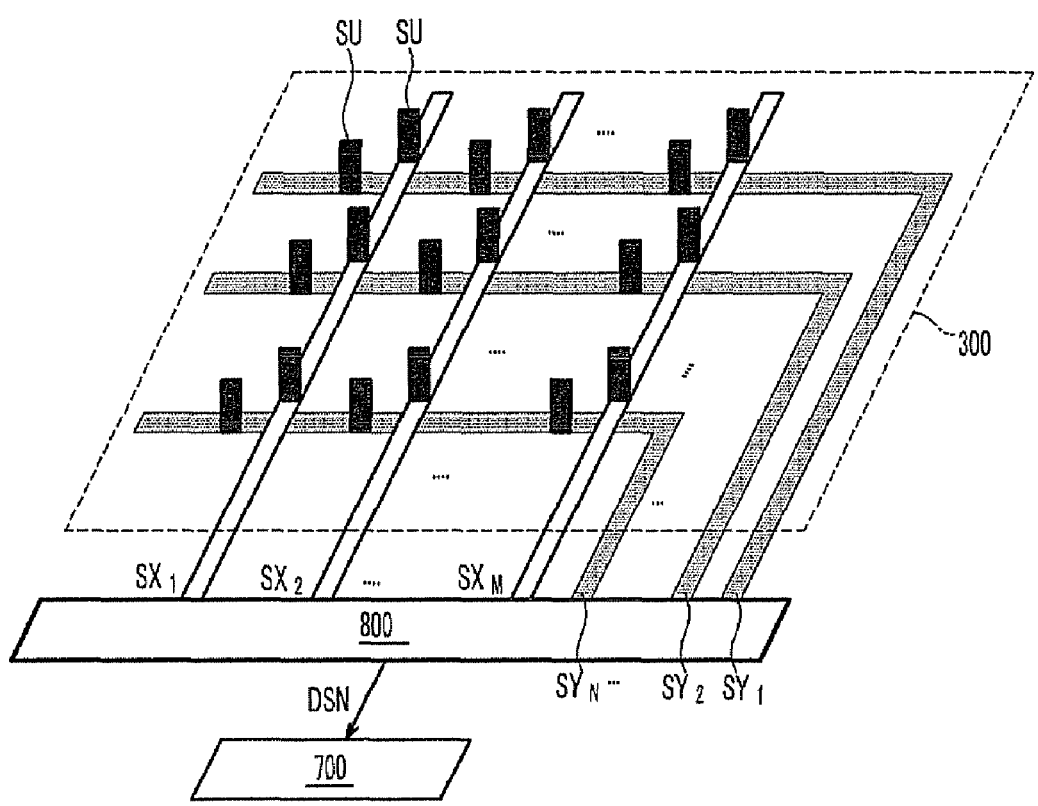
FIG. 3 is a block diagram of an exemplary LCD according to an exemplary embodiment of the present invention, focusing on sensing units.
Figure 4:
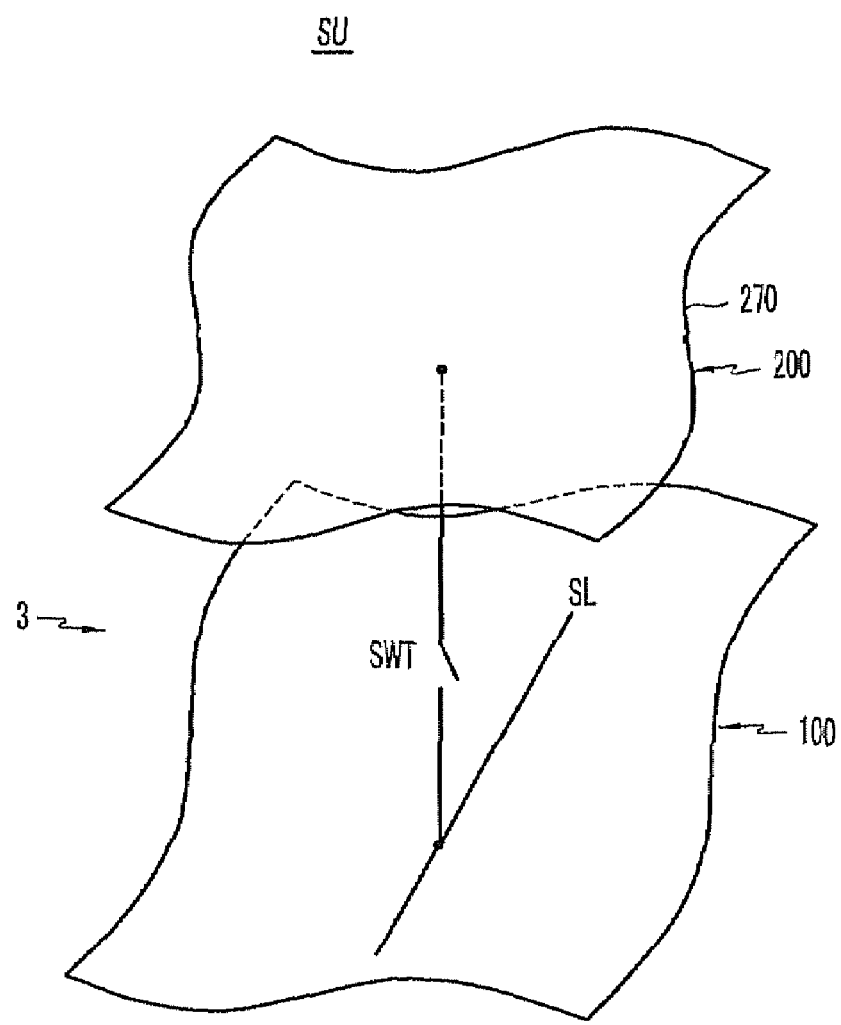
FIG. 4 is an equivalent circuit diagram of an exemplary LCD according to an exemplary embodiment of the present invention.
Figure 5:
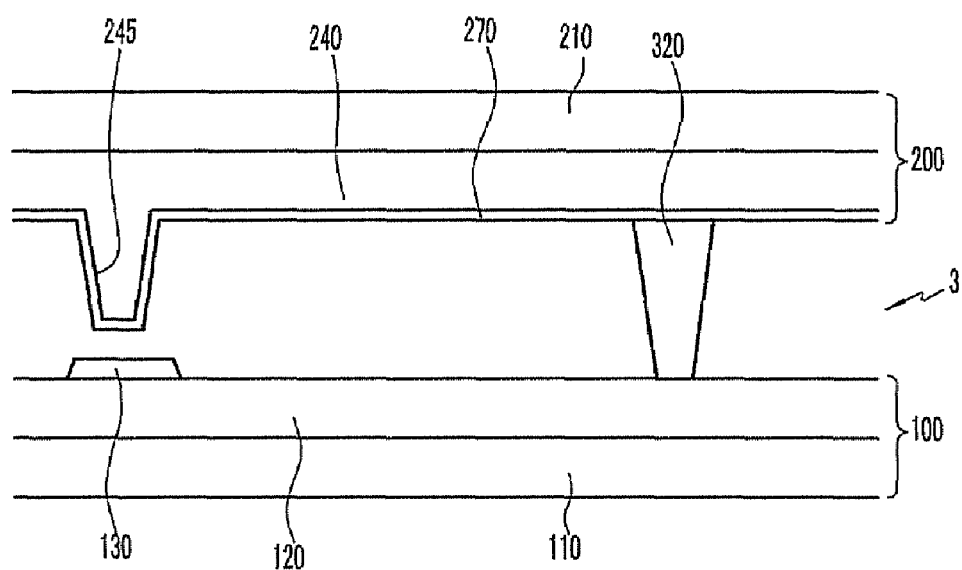
FIG. 5 is a schematic cross-sectional view of an exemplary pressure-sensing unit according to an exemplary embodiment of the present invention.
Figure 6:
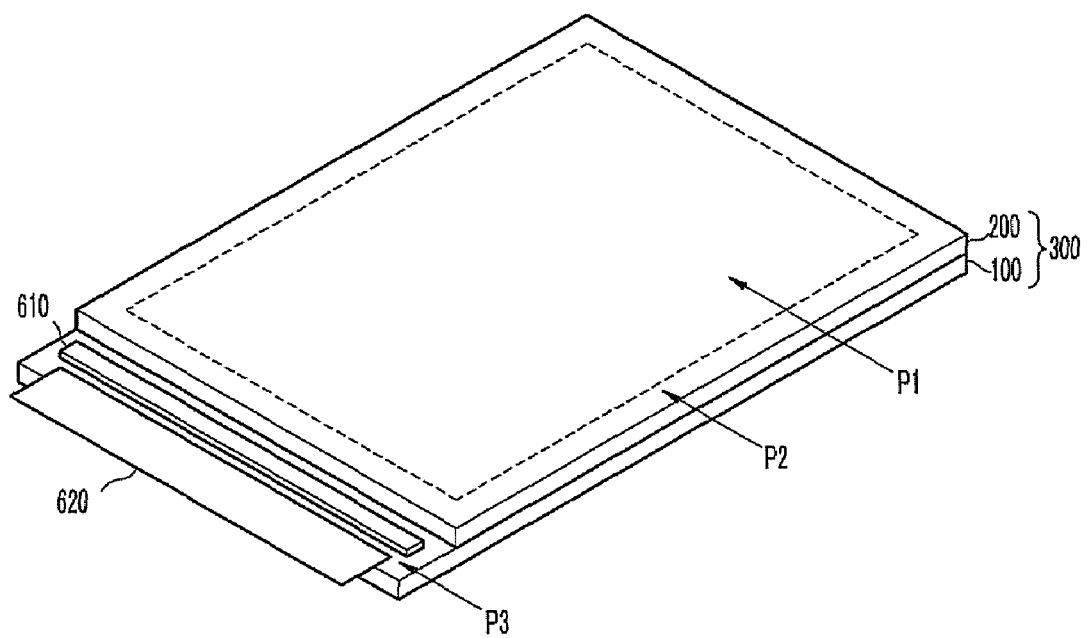
FIG. 6 is a schematic view of an exemplary LCD device according to an exemplary embodiment of the present invention.

FIG. 1 is a block diagram of an exemplary LCD according to an exemplary embodiment of the present invention, focusing on pixels. FIG. 2 is an equivalent circuit diagram of one exemplary pixel of an exemplary LCD according to an exemplary embodiment of the present invention. FIG. 3 is a block diagram of an exemplary LCD according to an exemplary embodiment of the present invention, focusing on sensing units. FIG. 4 is an equivalent circuit diagram of an exemplary LCD according to an exemplary embodiment of the present invention. FIG. 5 is a schematic cross-sectional view of an exemplary pressure-sensing unit according to an exemplary embodiment of the present invention. FIG. 6 is a schematic view of an exemplary LCD device according to an exemplary embodiment of the present invention.

Referring to FIG. 1 and FIG. 3, the LCD includes a liquid crystal panel assembly 300, an image scanning driver 400 connected to the liquid crystal panel assembly 300, an image data driver 500, a sensing signal processor 800, a gray voltage generator 550 connected to the image data driver 500, a contact determiner 700 connected to the sensing signal processor 800, and a signal controller 600 for controlling these elements.

Referring to FIG. 1 to FIG. 4, the liquid crystal panel assembly 300 includes a plurality of display signal lines $G_1$ to $G_n$ and $D_1$ to $D_m$, a plurality of pixels PX connected to the display signal lines $G_1$ to $G_n$ and $D_1$ to $D_m$ and arranged substantially in a matrix form, a plurality of sensing signal lines $SY_1$ to $SY_N$ and $SX_1$ to $SX_M$, and a plurality of sensing units SU connected to the sensing signal lines $SY_1$ to $SY_N$ and $SX_1$ to $SX_M$ and arranged substantially in a matrix form.

Meanwhile, referring to FIG. 2, the liquid crystal panel assembly 300 includes a thin film transistor ("TFT") array panel 100, a lower panel, and a common electrode panel 200, an upper panel, which face each other, a liquid crystal layer 3 sandwiched there between, and a column spacer (shown in FIG. 5) which forms a gap between the two display panels 100 and 200 and is deformed to some extent when compressed.

The signal lines $G_1$ to $G_n$ and $D_1$ to $D_m$ include a plurality of image scanning lines $G_1$ to $G_n$, also known as gate lines, for transmitting an image scan signal, and a plurality of image data lines $D_1$ to $D_m$, also known as source lines, for transmitting an image data signal. The sensing signal lines $SY_1$ to $SY_N$ and $SX_1$ to $SX_M$ include a plurality of horizontal sensing data lines $SY_1$ to $SY_N$ and a plurality of vertical sensing data lines $SX_1$ to $SX_M$ for transmitting a sensing data signal.

The image scanning lines $G_1$ to $G_n$ and the horizontal sensing data lines $SY_1$ to $SY_N$ are arranged substantially in a row direction, a first direction, and are substantially parallel with one another. The image data lines $D_1$ to $D_m$ and the vertical sensing data lines $SX_1$ to $SX_M$ are arranged substantially in a column direction, a second direction, and are substantially parallel with one another. The first direction may be substantially perpendicular to the second direction.

Each pixel PX may include a switching element Q connected to an i-th (i=1, 2, ..., n) image scanning line $G_i$ and a j-th (j=1, 2, ..., m) image data line $D_j$, a liquid crystal capacitor Clc connected to the switching element Q, and a storage capacitor Cst. In an alternative embodiment, the storage capacitor Cst may be omitted.

The switching element Q is a three-terminal element such as a TFT included in the TFT array panel 100. A control terminal thereof, such as a gate electrode, is connected to the image scanning line $G_j$, an input terminal thereof, such as a source electrode, is connected to the image data line $D_j$, and an output terminal thereof, such as a drain electrode, is connected to the liquid crystal capacitor Clc and the storage capacitor Cst. The TFT includes amorphous silicon ("a-Si") or polycrystalline silicon.

The liquid crystal capacitor Clc includes two terminals, that is, a pixel electrode 191 of the TFT array panel 100 and a common electrode 270 of the common electrode panel 200. The liquid crystal layer 3 interposed between the two electrodes 191 and 270 functions as a dielectric material. The pixel electrode 191 is connected to the switching element Q. The common electrode 270 is formed over the entire surface, or at least substantially the entire surface, of the common electrode panel 200, and is supplied with a common voltage Vcom. In an alternative embodiment, the common electrode 270 may be included in the TFT array panel 100. In this case, at least one of the two electrodes 191 and 270 may be formed in a linear shape or a bar shape.

The storage capacitor Cst for assisting the liquid crystal capacitor Clc is formed such that a separate signal line (not shown), such as a storage electrode line, included in the TFT array panel 100 overlaps the pixel electrode 191 with an insulator sandwiched there between. The separate signal line is supplied with a predetermined voltage such as the common voltage Vcom. The storage capacitor Cst may be formed when the pixel electrode 191 overlaps an image scanning line of a previous stage disposed directly thereon through the medium of the insulator.

In order to achieve color display, each pixel PX may represent one of a set of colors (spatial division), or each pixel PX may alternately represent the set of colors (temporal division), so that a desired color can be obtained by combining the colors in the set of colors spatially and temporally. Examples of the colors include three primary colors, that is, red, green, and blue. FIG. 2 shows an example of a spatial division in which each pixel PX is provided with a color filter 230 for presenting any one of the colors in the set of colors in a region of the common electrode panel 200 corresponding to the pixel electrode 191. Alternatively, the color filter 230 may be formed either on or under the pixel electrode 191 of the TFT array panel 100.

At least one polarizer (not shown) may be attached on the outer surface of the liquid crystal panel assembly 300 so as to polarize light. For example, a first polarized film and a second polarized film may be disposed on the TFT array panel 100 and the common electrode panel 200, respectively. The first and second polarized films may adjust a transmission direction of light externally provided into the TFT array panel 100 and the common electrode panel 200, respectively, in accordance with an aligned direction of the liquid crystal layer 3. The first and second polarized films may have first and second polarized axes thereof substantially perpendicular to each other.

The sensing units SU may have a structure as shown in FIG. 4 and FIG. 5.

The sensing unit SU of FIG. 4 and FIG. 5 is a pressure-sensing unit including a switch SWT connected to a horizontal or vertical sensing data line indicated by reference indicia SL (hereinafter, referred to as a sensing data line). The switch SWT has two terminals that are respectively connected to the common electrode 270 of the common electrode panel 200 and the sensing data line SL of the TFT array panel 100. At least one of the two terminals protrudes so that a user can physically and electrically connect them with each other. Accordingly, the common voltage Vcom is output to the sensing data line SL from the common electrode 270 so as to be used as a sensing data signal.

A cross-sectional structure of the pressure-sensing unit SU will be further described with reference to FIG. 5.

Referring to FIG. 5, the TFT array panel 100 includes an insulation substrate 110 made of transparent glass or plastic, a pixel layer 120 in which the image scanning lines $G_1$ to $G_m$, the horizontal sensing data lines $SY_1$ to $SY_N$, the image data lines $D_1$ to $D_m$, the vertical sensing data lines $SX_1$ to $SX_M$, and the switching element Q are formed on the insulation substrate 110, and ohmic contact members 130 which are connected to the horizontal and vertical sensing data lines $SY_1$ to $SY_N$ and $SX_1$ to $SX_M$ and are formed on the pixel layer 120. The pixel electrodes 191 are formed within a same layer of the TFT array panel 100 as the contact members 130. The contact member 130 may be made of a transparent conductor such as indium tin oxide ("ITO") or indium zinc oxide ("IZO").

The common electrode panel 200 facing the TFT array panel 100 is provided with a color filter layer 240 in which a light blocking member, a plurality of color filters, and an overcoat are formed on an insulating substrate 210 made of transparent glass or plastic. The overcoat includes a plurality of sensing protrusions 245.

The sensing protrusions 245 correspond to the horizontal and vertical sensing data lines $SY_1$ to $SY_N$ and $SX_1$ to $SX_M$ formed on the pixel layer 120 of the TFT array panel 100.

The common electrode 270 is formed on the color filter layer 240.

The common voltage Vcom is supplied to the common electrode 270. Column spacers 320 made of a photosensitive material are formed on the common electrode 270.

The column spacers 320 are uniformly distributed over the liquid crystal panel assembly 300 and support panels 100 and 200, thereby forming a gap there between. In an alternative embodiment, the two display panels 100 and 200 may be supported by means of bead spacers (not shown) instead of the column spacers 320.

An alignment layer (not shown) is applied over the inner surfaces of the display panels 100 and 200 so as to align the liquid crystal layer 3.

Further, the LCD may include a sealant (not shown) for connecting the panels 100 and 200. The sealant may be located at an edge of the upper panel 200.

The common electrode 270 surrounding a sensing protrusion 245 and a contact member 130 connected to a horizontal or vertical sensing data line $SY_1$ to $SY_N$ or $SX_1$ to $SX_M$ formed on the pixel layer 120 form the switch SWT of FIG. 4.

The Y-coordinate of a contact point can be determined by analyzing a sensing data signal flowing through the horizontal sensing data lines $SY_1$ to $SY_N$, and the X-coordinate of the contact point can be determined by analyzing a sensing data signal flowing through the vertical sensing data lines $SX_1$ to $SX_M$.

Each pressure-sensing unit SU is disposed between two adjacent pixels PX, however there may be fewer pressure-sensing units SU than pixels PX.

The density of a pair of sensing units SU, which are respectively connected to the horizontal and vertical sensing data lines $SY_1$ to $SY_N$ and $SX_1$ to $SX_M$ and are disposed adjacent to a region where they are crossed with each other, may be approximately ¼ as much as a dot density of pixel units. For example, a single dot includes three pixels PX, which present three colors (e.g., red, green, and blue) and are arranged in a line, it presents a single color, and is a basic unit for representing resolution of the LCD. However, the single dot may be composed of four or more pixels PX. In this case, each pixel PX may present the three primary colors and/or white color.

The density of the pair of sensing units SU may be ¼ as much as the dot density if vertical and horizontal resolutions of the pair of sensing units SU are respectively ½ as much as the vertical and horizontal resolutions of the LCD. In this case, there may be pixel rows and pixel columns that do not include the sensing units SU.

When the density of the sensing unit SU and the dot density are adjusted to that extent, the LCD can be applied to an application requiring high precision such as character recognition. It would be within the scope of these embodiments to provide the resolution of the sensing units SU higher or lower.

Referring back to FIG. 1 and FIG. 3, the gray voltage generator 550 generates two gray voltage groups (or reference gray voltage groups) in association with pixel transmittance. One of the two groups has a positive value with respect to the common voltage Vcom, and the other thereof has a negative value.

The image scanning driver 400 supplies image scan signals to the image scanning lines $G_1$ to $G_n$, wherein the image scan signal is composed of a gate-on voltage Von for turning on the switching elements Q and a gate-off voltage Voff for turning off the switching elements Q while being connected to the image scanning lines $G_1$ to $G_n$ of the liquid crystal panel assembly 300.

The image data driver 500 is connected to the image data lines $D_1$ to $D_m$ of the liquid crystal panel assembly 300. Further, the image data driver 500 selects a gray voltage generated by the gray voltage generator 550, and supplies the generated gray voltage to the image data lines $D_1$ to $D_m$ as an image data signal. However, when the gray voltage generator 550 does not supply voltages for all grays but rather just supplies reference gray voltages for a predetermined number of grays, the image data driver 500 divides the reference gray voltages so as to generate gray voltages for all grays and selects an image data signal therefrom.

The sensing signal processor 800 is connected to the sensing data lines $SY_1$ to $SY_N$ and $SX_1$ to $SX_M$ of the liquid crystal panel assembly 300, and receives sensing data signals output through the sensing data lines $SY_1$ to $SY_N$ and $SX_1$ to $SX_M$, thereby generating digital sensing signals DSN.

The contact determiner 700 may be composed of a central processor unit ("CPU"). Further, the contact determiner 700 receives the digital sensing signals DSN from the sensing signal processor 800, and determines whether or not the pressure-sensing units SU are in contact with the sensing data lines $SY_1$ to $SY_N$ and $SX_1$ to $SX_M$ and determines contact positions.

The signal controller 600 controls the image scanning driver 400, the image data driver 500, the gray voltage generator 550, and the sensing signal processor 800.

The driving units 400, 500, 550, 600, 700, and 800 may be directly mounted on the liquid crystal panel assembly 300 in the form of at least one integrated circuit ("IC") chip, or mounted on a flexible printed circuit ("FPC") film (not shown) to be attached on the liquid crystal panel assembly 300 in the form of a tape carrier package ("TCP"), or mounted on a separate printed circuit board ("PCB", not shown). Alternatively, the driving units 400, 500, 550, 600, 700, and 800 may be integrated into the liquid crystal panel assembly 300 along with the signal lines $G_1$ to $G_n$, $D_1$ to $D_m$, $SY_1$ to $SY_N$, and $SX_1$ to $SX_M$, and the TFTs Q.

Referring to FIG. 6, the liquid crystal panel assembly 300 is divided into a display area P1, an edge region P2, and an exposure region P3. The pixels PX, the sensing units SU, and the signal lines $G_1$ to $G_n$, $D_1$ to $D_m$, $SY_1$ to $SY_N$, and $SX_1$ to $SX_M$ are mostly located in the display area P1. A light-blocking member (shown in FIG. 11) formed on the color filter layer 240 of the common electrode panel 200 almost entirely covers the edge region P2, thereby blocking external light. Since the common electrode panel 200 is smaller than the TFT array panel 100, a part of the TFT array panel 100 is exposed, thereby forming the exposure region P3. The exposure region P3 is mounted with a single chip 610, and is attached with an FPC board 620.

The single chip 610 includes driving units for driving the LCD, that is, the image-scanning driver 400, the image data driver 500, the gray voltage generator 550, the signal controller 600, the contact determiner 700, and the sensing signal processor 800. When the driving units 400, 500, 550, 600, 700, and 800 are integrated into the single chip 610, a mounting area thereof can be reduced, and power consumption can decrease. Of course, at least one of the driving units or at least one circuit element constituting the driving units may exist outside the single chip 610 if necessary.

The image signal lines $G_1$ to $G_n$ and $D_1$ to $D_m$ and the sensing data lines $SY_1$ to $SY_N$ and $SX_1$ to $SX_M$ extend up to the exposure region P3, and are connected to corresponding driving units 400, 500, and 800.

The FPC board 620 receives signals from an external device, and transmits the signals to the single chip 610 or the liquid crystal panel assembly 300. To facilitate connection with the external device, end terminals of the FPC board 620 are generally composed of connectors (not shown).

Now, a display operation and a sensing operation of the LCD will be further described.

The signal controller 600 receives input image signals R, G, and B, and input control signals for controlling display in association with these signals R, G, and B from an external device (not shown). The input image signals R, G, and B contain information on luminance of each pixel PX. The luminance has the predetermined number of grays, for example, 1024 ($=2^{10}$), 256 ($=2^8$), or 64 ($=2^6$). Examples of the input control signals include a vertical synchronization signal Vsync, a horizontal synchronizing signal Hsync, a main clock signal MCLK, and a data enable signal DE.

On the basis of the input image signals R, G, and B and the input control signals, the signal controller 600 appropriately processes the input image signals R, G, and B according to operation conditions of the liquid crystal panel assembly 300 and the image data driver 500. Then, the signal controller 600 generates image scan control signals CONT1 and image data control signals CONT2, and thereafter sends the image scan control signals CONT1 to the image scanning driver 400, and sends the image data control signals CONT2 and the processed image signals DAT to the image data driver 500.

The image scan control signal CONT1 includes a scanning start signal STV for instructing a start of scanning, and at least one clock signal for controlling output of the gate-on voltage Von. Further, the image scan control signals CONT1 may include an output enable signal OE for defining a time duration of the gate-on voltage Von.

The image data control signals CONT2 include a horizontal synchronization start signal STH that indicates a start of transmission of an image data DAT of one pixel row, a load signal LOAD for indicating that an image data voltages have to be supplied to the image data lines $D_1$ to $D_m$, and a data clock signal HCLK. Further, the image data control signals CONT2 may include an inversion signal RVS that reverses the polarity of the image data voltages (relative to the common voltage Vcom).

In response to the image data control signals CONT2 received from the signal controller 600, the image data driver 500 receives digital image signals DAT for the row of pixels PX, and selects gray voltages corresponding to the digital image signals DAT. Then, the signal controller 600 converts the digital image signals DAT into analog data voltages, and supplies the analog image data voltages to corresponding image data lines $D_1$ to $D_m$.

According to the image scan control signals CONT1 received from the signal controller 600, the image scanning driver 400 supplies the gate-on voltage Von to the image scanning lines $G_1$ to $G_n$, so as to turn on the switching elements Q connected to the image scanning lines $G_1$ to $G_n$. Then, the image data voltages supplied to the image data lines $D_1$ to $D_m$ are supplied to corresponding pixels PX through the switching elements Q that are turned on.

A difference between the voltage of an image data voltage supplied to a pixel PX and the common voltage Vcom is represented as a voltage across the liquid crystal capacitor Clc of the pixel PX, which is referred to as a pixel voltage. Liquid crystal molecules are differently arranged depending on the magnitude of the pixel voltage, and thus polarization of light passing through the liquid crystal layer 3 varies. The polarizer(s) converts the light polarization into the light transmittance such that the pixel PX has a luminance represented by a gray of the data voltage.

By repeating this procedure by a unit of a horizontal period (also referred to as "1H" and equal to one period of the horizontal synchronization signal Hsync and the data enable signal DE), all image scanning lines $G_1$-$G_n$ are sequentially supplied with the gate-on voltage Von, thereby applying the data voltages to all pixels PX to display an image for a frame.

When the next frame starts after one frame finishes, the inversion control signal RVS applied to the data driver 500 is controlled such that the polarity of the data voltages is reversed (which is referred to as "frame inversion"). The inversion control signal RVS may also be controlled such that the polarity of the data voltages flowing in a data line are periodically reversed during one frame (for example, row inversion and dot inversion), or the polarity of the data voltages in one packet are reversed (for example, column inversion and dot inversion).

The sensing signal processor 800 converts sensing data signals flowing through the sensing data lines $SY_1$ to $SY_N$ and $SX_1$ to $SX_M$, generates digital sensing signals DSN in association with contact points of the X-axis and Y-axis of the pressure sensing units SU connected to the sensing data lines $SY_1$ to $SY_N$ and $SX_1$ to $SX_M$, and sends the digital sensing signals DSN to the contact determiner 700.

The contact determiner 700 receives the digital sensing signals DSN so as to determine whether or not the pressure sensing units SU are in contact with the sensing data lines $SY_1$ to $SY_N$ and $SX_1$ to $SX_M$ and to determine contact positions. The result is sent to an external device, so that the external device sends image signals R, G, and B based on the result to the LCD, thereby displaying a screen in association with a command or a menu selected by the user.

Figure 7:
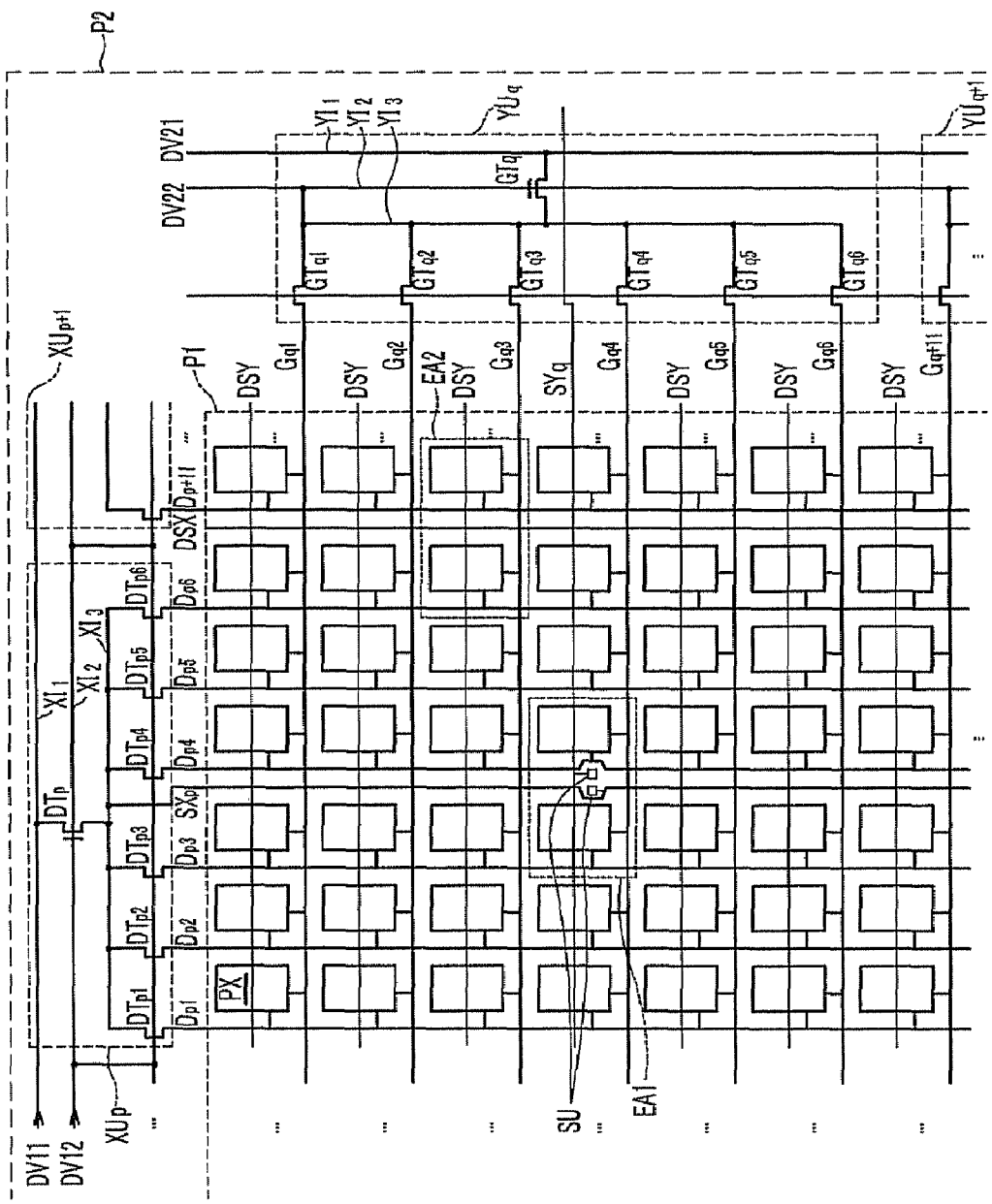
FIG. 7 is a schematic diagram of an exemplary LCD according to an exemplary embodiment of the present invention, wherein the LCD includes vertical and horizontal sensing data lines, vertical and horizontal axes test circuits connected to the vertical and horizontal sensing data lines, image data lines, image scanning lines, pixels, and a sensing unit.
Figure 8:
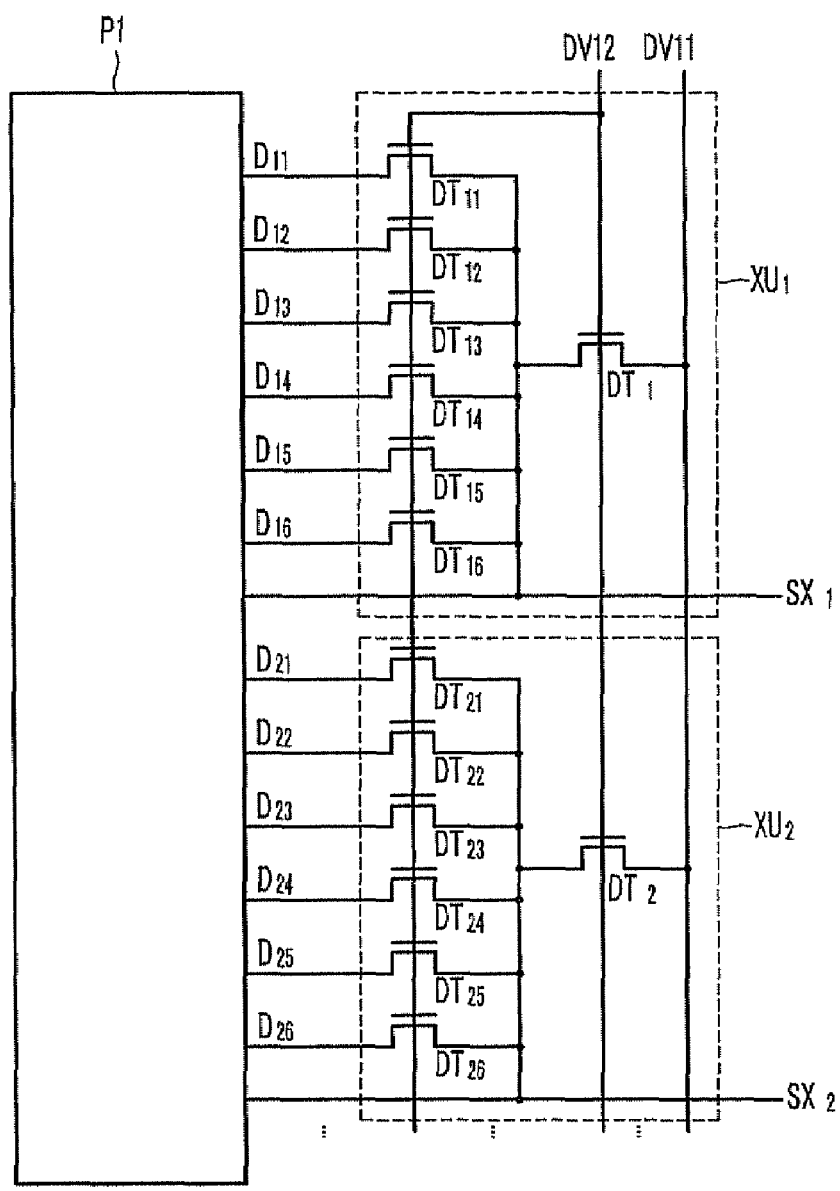
FIG. 8 is a schematic circuit diagram of an exemplary vertical axis test circuit for testing an exemplary sensing unit connected to an exemplary vertical sensing data line.
Figure 9:
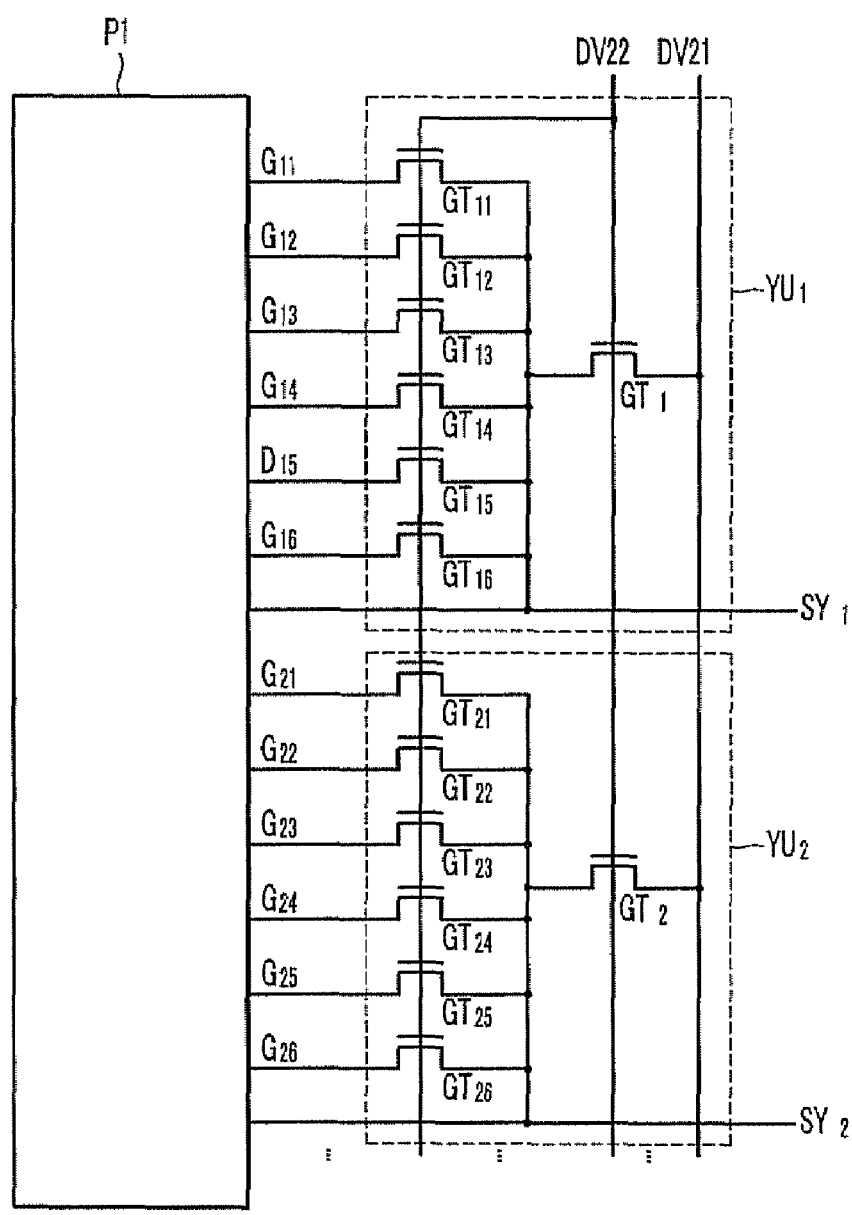
FIG. 9 is a schematic circuit diagram of an exemplary horizontal axis test circuit for testing an exemplary sensing unit connected to an exemplary horizontal sensing data line.

Referring now to FIG. 7 to FIG. 9, a method of testing the sensing units connected to the horizontal and vertical sensing data lines $SY_1$ to $SY_N$ and $SX_1$ to $SX_M$ will be described. FIG. 7 is a schematic diagram of an exemplary LCD according to an exemplary embodiment of the present invention, wherein the exemplary LCD includes vertical and horizontal sensing data lines, vertical and horizontal axes test circuits connected to the vertical and horizontal sensing data lines, the image data lines, the image scanning lines, pixels, and a sensing unit. FIG. 8 is a schematic circuit diagram of an exemplary vertical axis test circuit for testing exemplary sensing units connected to an exemplary vertical sensing data line, and FIG. 9 is a schematic circuit diagram of an exemplary horizontal axis test circuit for testing exemplary sensing units connected to an exemplary horizontal sensing data line.

Referring first to FIG. 7, pixels PX connected to the image scanning lines and image data lines and test circuits connected to the pixels PX and the vertical and horizontal sensing data lines according to an exemplary embodiment of the present invention will be described.

In the LCD of FIG. 7, the horizontal and vertical sensing data lines $SY_1$ to $SY_N$ and $SX_1$ to $SX_M$ and the sensing units SU connected to the sensing data lines $SY_1$ to $SY_N$ and $SX_1$ to $SX_M$ are respectively formed for each of two dots (hereinafter, referred to as "reference dot"). However, the arrangement of the horizontal and vertical sensing data lines $SY_1$ to $SY_N$ and $SX_1$ to $SX_M$ and the sensing units SU are provided only as an example, and thus the number of dots provided between sensing units SU may be modified. Dummy horizontal and vertical sensing data lines DSY and DSX are formed between dots where the horizontal and vertical sensing data lines $SY_1$ to $SY_N$ and $SX_1$ to $SX_M$ are not formed, so that gaps between dots where the sensing data lines $SY_1$ to $SY_N$ and $SX_1$ to $SX_M$ are formed and gaps between dots where the sensing data lines $SY_1$ to $SY_N$ and $SX_1$ to $SX_M$ are not formed are almost uniform.

Referring now to FIG. 7 and FIG. 8, a vertical axis test circuit unit for testing the sensing units SU connected to the vertical sensing data lines $SX_1$ to $SX_M$ will be described.

As shown in FIG. 7 and FIG. 8, the vertical axis test circuit unit includes a plurality of vertical axis test circuits $XU_1$ to $XU_M$.

As shown in FIGS. 7 and 8, each of the image data lines $D_1$ to $D_m$ can be divided into a plurality of (e.g., M) image data line groups $D_{11}$ to $D_{16}$, $D_{21}$ to $D_{26}$, ..., and $D_{M1}$ to $D_{M6}$ composed of six image data lines, although an alternate number of image data lines may be provided in the image data line groups. Each of the image data line groups $D_{11}$ to $D_{16}$, $D_{21}$ to $D_{26}$, ..., and $D_{M1}$ to $D_{M6}$ is connected to one corresponding vertical axis test circuit $XU_1$ to $XU_M$ that is connected to one of the corresponding vertical sensing data lines $SX_1$ to $SX_M$. Each vertical sensing data line $SX_1$ to $SX_M$ may be advantageously located substantially at a center portion of a corresponding image data line group $D_{11}$ to $D_{16}$, $D_{21}$ to $D_{26}$, ..., and $D_{M1}$ to $D_{M6}$ in terms of sensitivity of the sensing unit SU.

Each of the vertical axis test circuits $XU_1$ to $XU_M$ may have the same structure except for the image data line group $D_{11}$ to $D_{16}$, $D_{21}$ to $D_{26}$, ..., and $D_{M1}$ to $D_{M6}$ and the vertical sensing data line $SX_1$ to $SX_M$ connected thereto. Thus, only a p-th vertical axis test circuit $XU_p$ connected to a p-th (p=1, 2, ..., M) vertical sensing data line $SX_p$ will be described.

The p-th test circuit $XU_p$ includes transistors $DT_{p1}$ to $DT_{p6}$ and a transistor $DT_p$ connected to the transistors $DT_{p1}$ to $DT_{p6}$.

The transistor $DT_p$ is a three-terminal element such as a TFT included in the TFT array panel 100. An input terminal thereof, such as a source electrode, is connected to the first vertical axis test line DV11 to which the first vertical axis test signal is supplied. A control terminal thereof, such as a gate electrode, is connected to the second vertical axis test line DV12 to which the second vertical axis test signal is supplied. An output terminal thereof, such as a drain electrode, is connected to a vertical sensing data line $SX_p$.

Similarly, the transistors $DT_{p1}$ to $DT_{p6}$ are also three-terminal elements such as TFTs included in the TFT array panel 100. Each input terminal thereof is commonly connected to an output terminal of the transistor $DT_p$, each control terminal thereof is connected to the second vertical axis test line DV12, and each output terminal thereof is connected to the p-th image data line group $D_{p1}$ to $D_{p6}$ connected to each pixel of the unit dot.

Referring now to FIG. 7 and FIG. 9, a horizontal axis test circuit unit for testing sensing units SU connected to the horizontal sensing data lines $SY_1$ to $SY_N$ will be described.

As shown in FIG. 7 and FIG. 9, the horizontal axis test circuit portion includes a plurality of horizontal axis test circuits $YU_1$ to $YU_N$.

Each of the image scanning lines $G_1$ to $G_n$ can be divided into a plurality of (e.g., N) image scanning line groups $G_{11}$ to $G_{16}$, $G_{21}$ to $G_{26}$, ..., and $G_{N1}$ to $G_{N6}$ composed of six image scanning lines, although an alternate number of image scanning lines may be provided in the image scanning line groups. Each image scanning line group $G_{11}$ to $G_{16}$, $G_{21}$ to $G_{26}$, ..., and $G_{N1}$ to $G_{N6}$ is connected to one corresponding horizontal axis test circuit $YU_1$ to $YU_N$ connected to one of the corresponding horizontal sensing data lines $SY_1$ to $SY_N$. In this case, the horizontal sensing data lines $SY_1$ to $SY_N$ are preferably disposed substantially at the center portions of corresponding image scanning line groups $G_{11}$ to $G_{16}$, $G_{21}$ to $G_{26}$, ..., and $G_{N1}$ to $G_{N6}$ for better sensitivity of the sensing unit SU.

Each of the plurality of horizontal axis test circuits $YU_1$ to $YU_N$ has substantially the same structure with one another except for the connected image scanning line groups $G_{11}$ to $G_{16}$, $G_{21}$ to $G_{26}$, ..., and $G_{N1}$ to $G_{N6}$ and the horizontal sensing data lines $SY_1$ to $SY_N$. Thus, only the q-th test circuit $YU_q$ connected to the q-th (q=1, 2, ..., N) horizontal sensing data line $SY_q$ will be described.

As shown in FIG. 7 and FIG. 9, the q-th test circuit $YU_q$ includes transistors $GT_{q1}$ to $GT_{q6}$ and a transistor $GT_q$ connected to the transistors $GT_{q1}$ to $GT_{q6}$.

The transistor $GT_q$ is a three-terminal element such as a TFT included in the TFT array panel 100. An input terminal thereof, such as a source electrode, is connected to a first horizontal axis test line DV21 through which the first horizontal axis test signal is supplied, a control terminal thereof, such as a gate electrode, is connected to the second horizontal axis test line DV22 through which the second horizontal axis test signal is applied, and an output terminal thereof, such as a drain electrode, is connected to the horizontal sensing data line $SY_q$.

The transistors $GT_{q1}$ to $GT_{q6}$ are also three-terminal elements such as TFTs included in the TFT array panel 100. Each input terminal thereof is commonly connected to the output terminal of the transistor $GT_q$, each control terminal thereof is connected to the second horizontal axis test line DV22, and each output terminal thereof is connected to the q-th image scanning line groups $G_{q1}$ to $G_{q6}$ connected to each pixel of the reference dot.

In FIG. 7, the image data lines $D_1$ to $D_m$ are all disposed to the left sides of the pixels PX, and the image scanning lines $G_1$ to $G_n$ are all disposed below the pixels PX. However, the present invention is not limited thereto, and thus the image data lines $D_1$ to $D_m$ and the image scanning lines $G_1$ to $G_n$ may be connected to the pixels PX in a different manner.

Further, although the vertical axis test circuit units $XU_1$ to $XU_M$ are illustrated as formed an upper portion of the LCD, and the horizontal axis test circuit units $YU_1$ to $YU_N$ are illustrated as formed at the right side of the LCD, these vertical and horizontal axis test circuit units $XU_1$ to $XU_M$ and $YU_1$ to $YU_N$ are not limited to the above positions, but may be disposed in different positions. In addition, while the vertical and horizontal axis test circuit units $XU_1$ to $XU_M$ and $YU_1$ to $YU_N$ are all illustrated as formed in the edge region P2, the positionings thereof are not limited thereto.

Now, the test operation of the sensing units SU by using the vertical and horizontal axis test circuits $XU_1$ to $XU_M$ and $YU_1$ to $YU_N$ will be described. It will be assumed that the image scanning lines $G_1$ to $G_n$ and the image data lines $D_1$ to $D_m$ are all in a normal state before the sensing units SU are tested.

First, a method of testing the sensing units SU connected to the vertical sensing data line $SX_p$ will be described.

When the vertical sensing data line $SX_p$ is tested, the gate-on voltage Von has already been supplied to each of the image scanning lines $G_{11}$ to $G_{16}$, $G_{21}$ to $G_{26}$, ..., and $G_{N1}$ to $G_{N6}$ through a separate test device.

Next, by utilizing the separate test device, the second vertical axis test line DV12 is supplied with the second vertical axis test signal of about 20V suitable for turning on the transistors $DT_p$ and $DT_{p1}$ to $DT_{p6}$, thereby turning on each transistor $DT_p$ and $DT_{p1}$ to $DT_{p6}$. Next, a voltage indicating a specific gray such as black gray, for example the first vertical axis test signal of about 5V, is supplied to the first vertical axis test line DV11 as the image data voltage, so as to be supplied to corresponding data lines $D_{p1}$ to $D_{p6}$ via the transistors $DT_p$ and $DT_{p1}$ to $DT_{p6}$ that are turned on. As a result, the pixel PX of the LCD presents the black gray.

In this state, if a pixel group connected to at least one vertical axis test circuit $XU_p$ presents a different gray other than black, for example if a white vertical pattern is formed while an external pressure is not imposed by the user's finger or the like, then the sensing unit SU connected to the vertical sensing data line $SX_p$ included in the vertical axis test circuit $XU_p$ is determined to be in an abnormal state.

Further, the common electrode 270 formed on the sensing protrusions 245 of the common electrode panel 200 may be electrically shorted with respect to the contact members 130 facing the sensing protrusions 245. As a result, it is determined that the common voltage Vcom has been supplied to the vertical axis test circuit $XU_p$ connected to the contact members 130. Accordingly, the common voltage Vcom is supplied to the image data line group $D_{p1}$ to $D_{p6}$ connected to the vertical axis test circuit $XU_p$, and thus the pixel group connected to the image data line group $D_{p1}$ to $D_{p6}$ presents a gray corresponding to the magnitude of the common voltage Vcom. Therefore, it is determined that the sensing units SU connected to the vertical sensing data line $SX_p$ is in an abnormal state.

When the operation of testing the sensing units SU connected to the vertical sensing data line $SX_p$ is completed, the gate-off voltage Voff for turning off the transistors $DT_p$ and $DT_{p1}$ to $DT_{p6}$ is supplied to the second vertical axis test line DV12.

Now, an operation of testing the horizontal sensing data line $SY_q$ will be described.

When the horizontal sensing data line $SY_q$ is tested, the image data voltage indicating that a specific gray has already been supplied to each of the image data lines $D_1$ to $D_m$ is supplied via a separate test device.

In this state, by utilizing the separate test device, the second horizontal axis test signal having a sufficient magnitude to turn on the transistors $GT_q$ and $GT_{q1}$ to $GT_{q6}$ is supplied to the second horizontal axis test line DV22, thereby turning on each transistor $GT_q$ and $GT_{q1}$ to $GT_{q6}$. Further, the first horizontal axis test signal having a magnitude equal to the gate-on voltage Von for turning on the switching element Q of each pixel PX is supplied to the first horizontal axis test line DV21. Accordingly, the first horizontal axis test signal is supplied to a corresponding image scanning line group $G_{q1}$ to $G_{q6}$ as an image data voltage. Therefore, the image data voltage is supplied to the pixels PX connected to each of the image scanning lines $G_{q1}$ to $G_{q6}$, and the specific gray is thereby presented.

However, if the pixel group connected to at least one horizontal axis test circuit $YU_q$ presents a gray that is different from those in its vicinity, and thus a horizontal pattern is formed in a state that the external pressure is not imposed, it is determined that the sensing units SU connected to the horizontal sensing data line $SY_q$ included in the horizontal axis test circuit $YU_q$ is in an abnormal state. Further, the common electrode 270 formed on the sensing protrusions 245 is electrically shorted with respect to the associated contact members 130 facing thereto, and thus the common voltage Vcom is supplied to the horizontal sensing data line $SY_q$ connected to the contact members 130. As a result, the image scanning line group $G_{q1}$ to $G_{q6}$ connected to the associated horizontal axis test circuit $YU_q$ is not supplied with the normal gate-on voltage Von, and instead it is determined that the common voltage Vcom has already been supplied. Therefore, the pixel group connected to the associated horizontal axis test circuit $YU_q$ does not operate normally, and thus a normal gray indication is not achieved. Consequently, the sensing unit SU connected to the horizontal sensing data line $SY_q$ included in the horizontal axis test circuit $YU_q$ is determined to be in an abnormal state.

When the operation of testing the sensing units SU connected to the horizontal sensing data line $SY_q$ is completed as described above, the gate-off voltage Voff or the like for turning off the transistors $GT_q$ and $GT_{q1}$ to $GT_{q6}$ is supplied to the second horizontal axis test line DV22. Since an inferiority condition of the sensing units SU connected to each of the vertical and horizontal sensing data lines $SX_p$ and $SY_q$ is indicated through pixels PX, additional testing equipment is not required, and test efficiency is improved. That is, an abnormal state of the sensing units SU may be determined via the pixels PX, such as through a visual inspection of the pixels PX.

Now, an exemplary LCD employing the plurality of test lines DV11, DV12, DV21, and DV22, the vertical and horizontal axis test circuits $XU_p$ and $YU_q$, and the sensing units SU will be further described with reference to FIG. 10 to FIG. 18.

Figure 10:
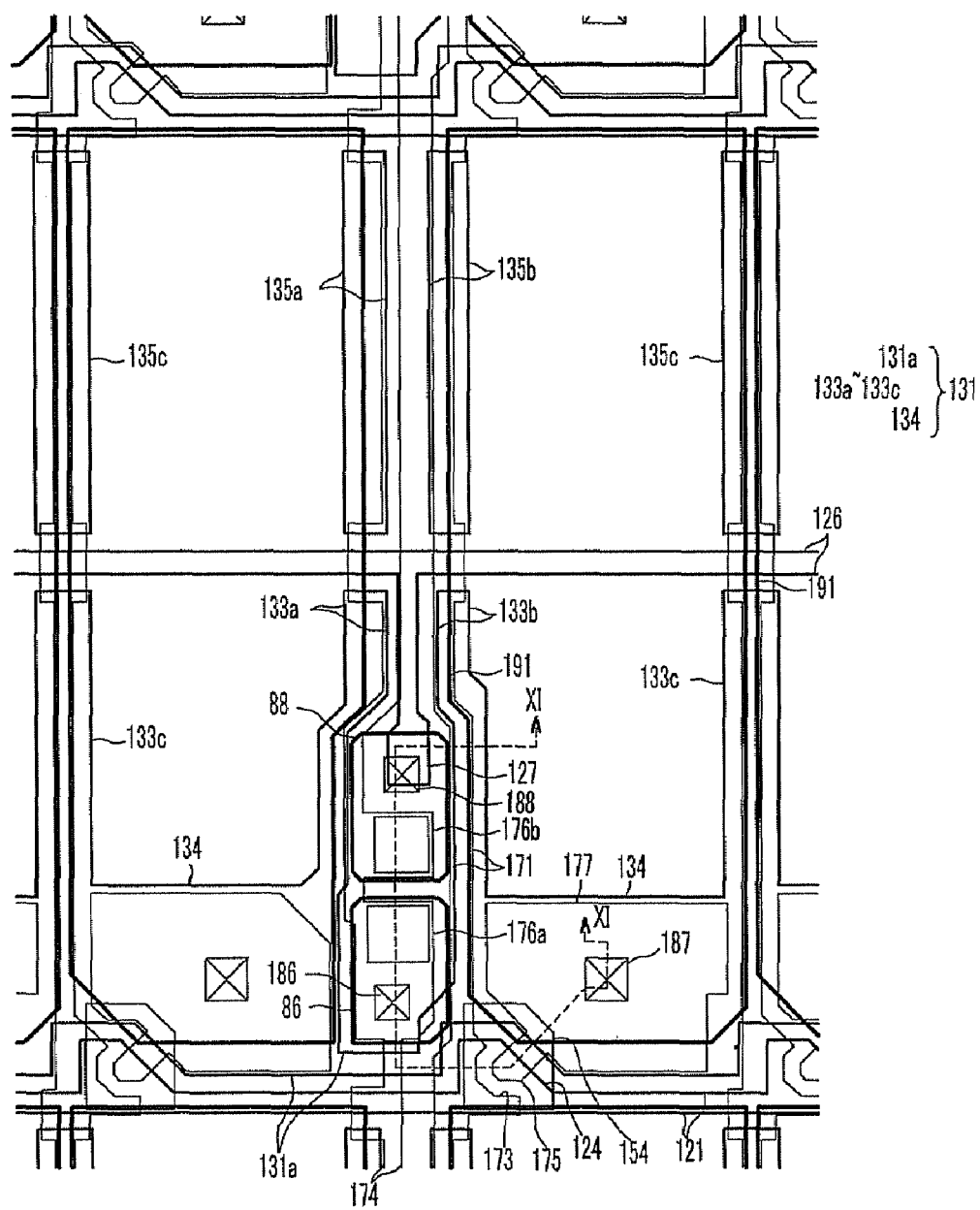
FIG. 10 is a layout view of portion EA1 of the exemplary LCD of FIG. 7.
Figure 11:
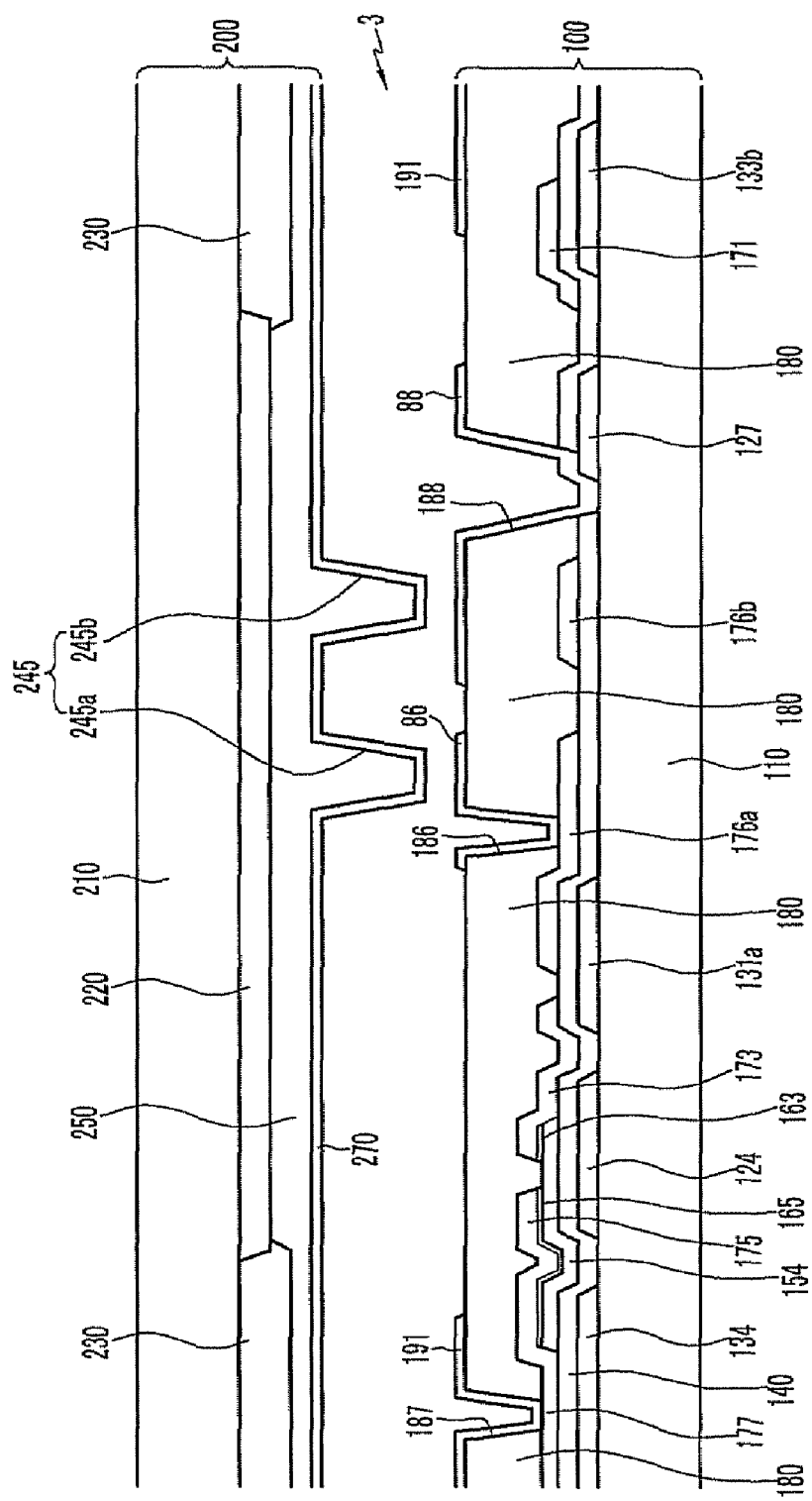
FIG. 11 is a cross-sectional view of the exemplary LCD of FIG. 10, taken along line XI-XI.
Figure 12:
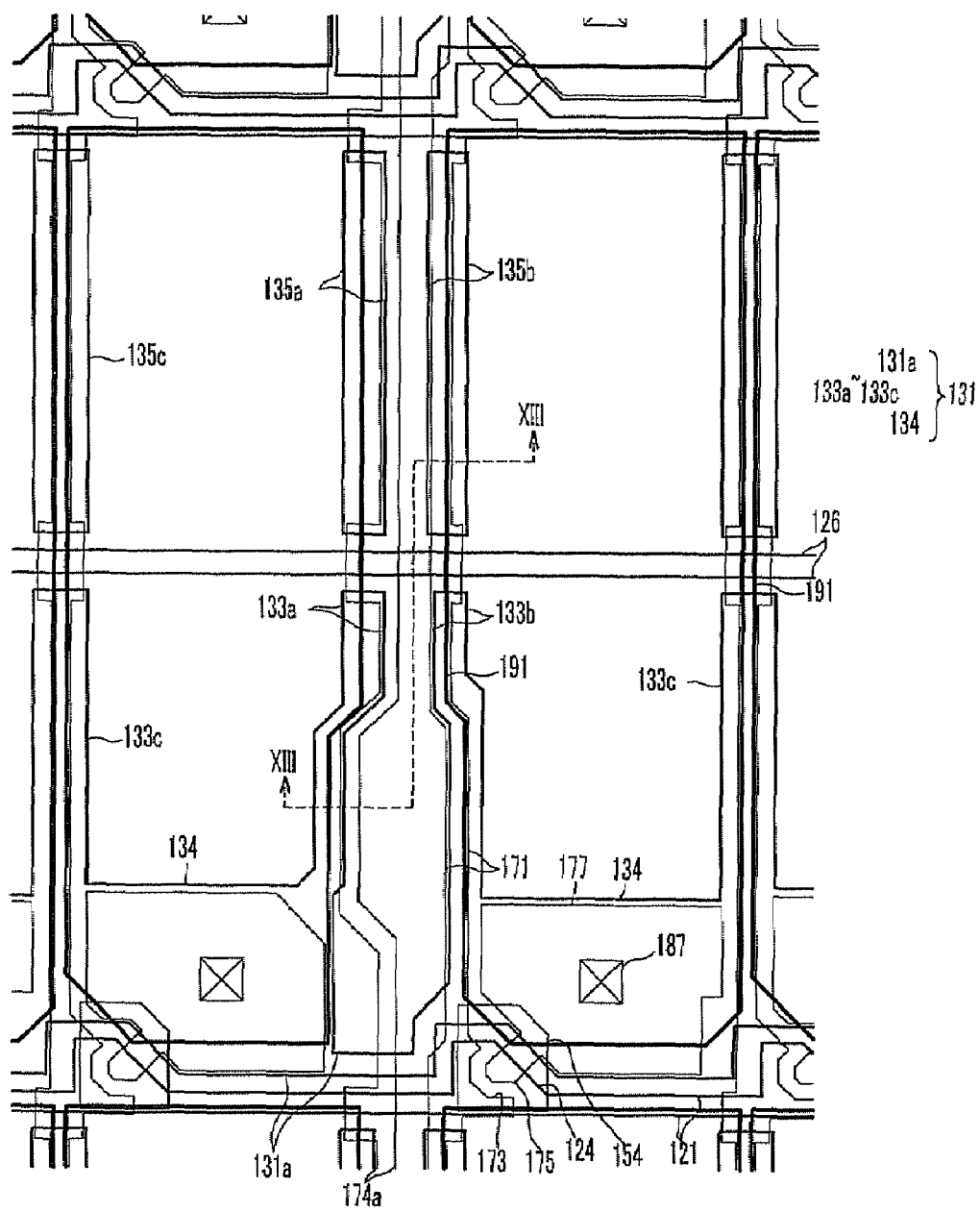
FIG. 12 is a layout view of portion EA2 of the exemplary LCD of FIG. 7.
Figure 13:
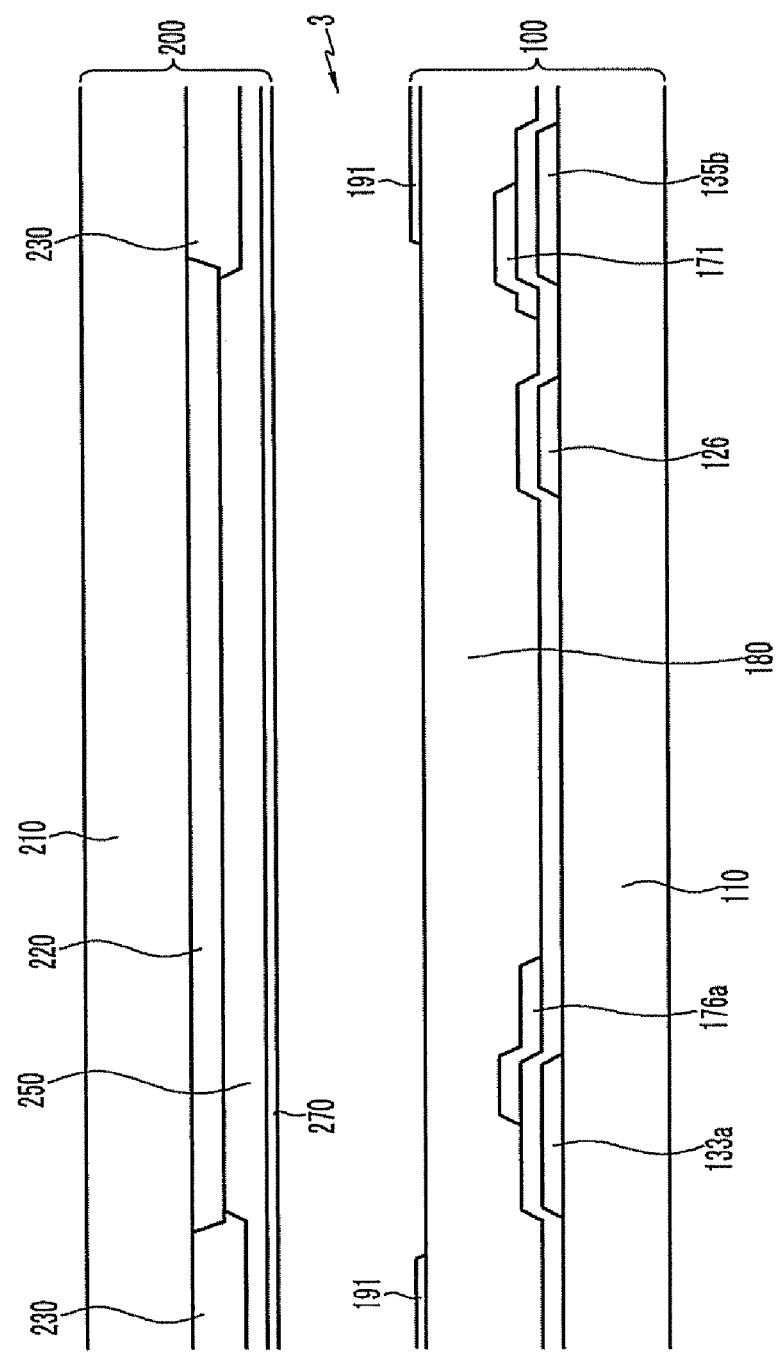
FIG. 13 is a cross-sectional view of the exemplary LCD of FIG. 12, taken along line XIII-XIII.
Figure 14:
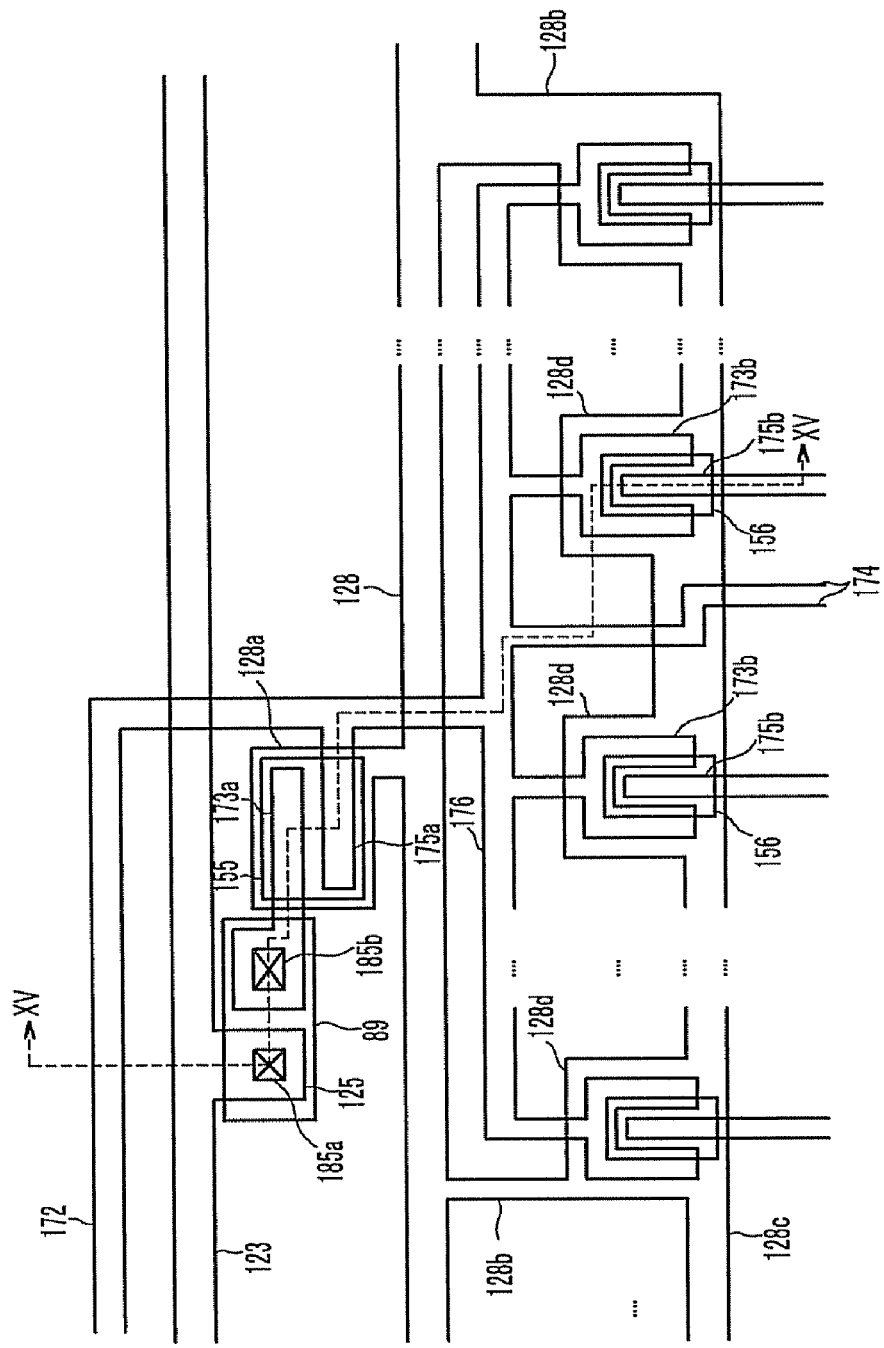
FIG. 14 is a layout view showing an exemplary vertical axis test circuit portion of an exemplary LCD according to an exemplary embodiment of the present invention.
Figure 15:
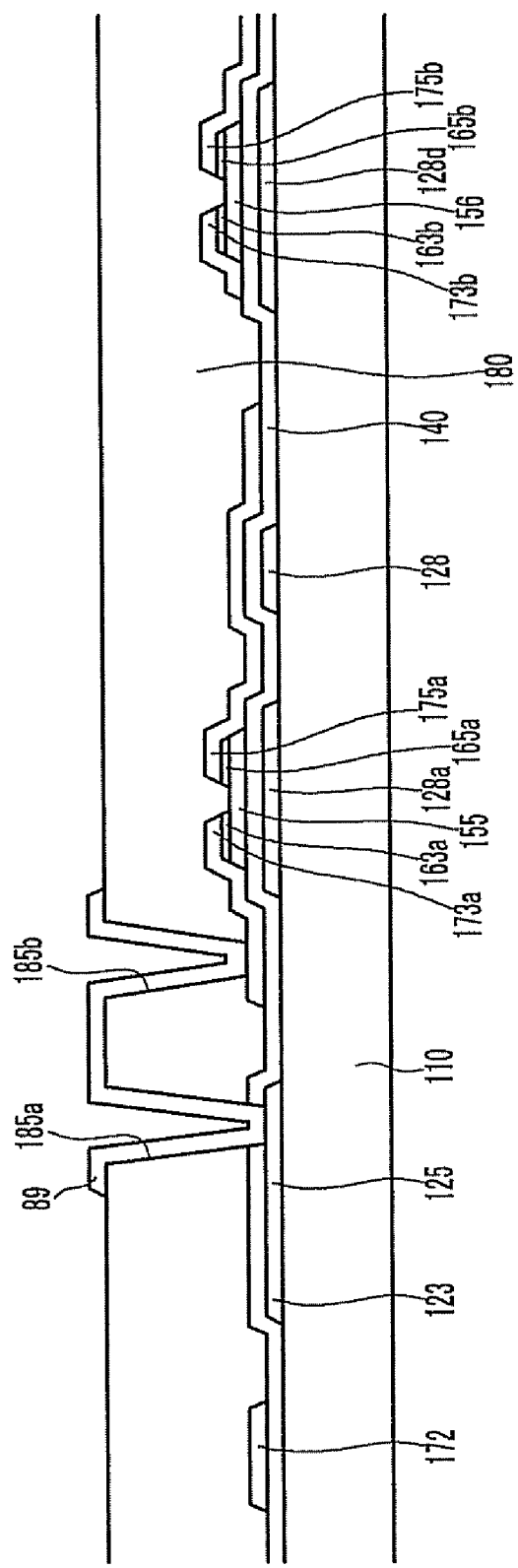
FIG. 15 is a cross-sectional view of the exemplary vertical axis test circuit portion of FIG. 14, taken along line XV-XV.
Figure 16:
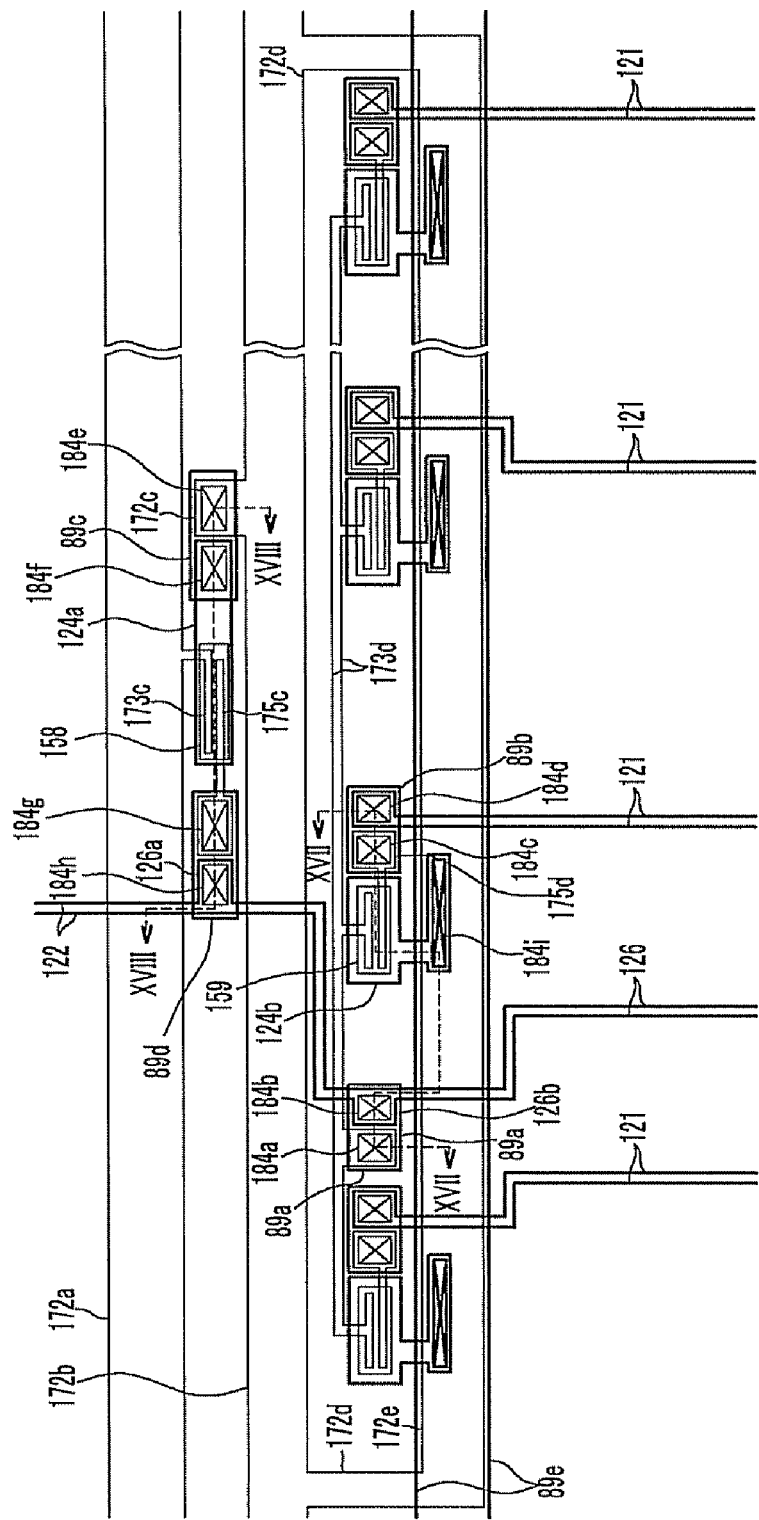
FIG. 16 is a layout view showing an exemplary horizontal axis test circuit portion of an exemplary LCD according to an exemplary embodiment of the present invention.
Figure 17:
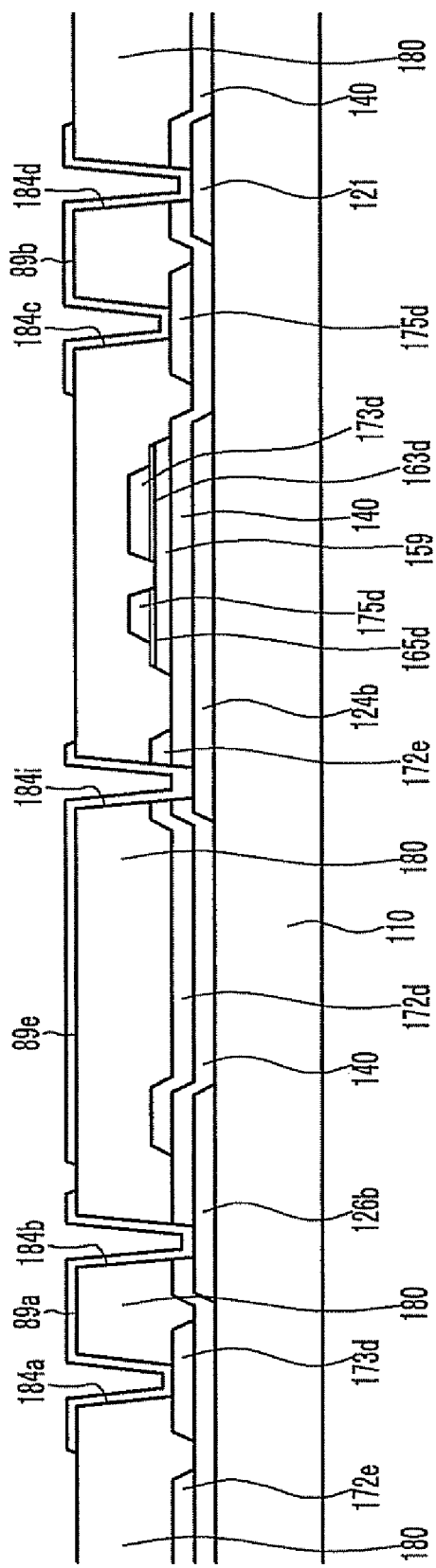
FIG. 17 is a cross-sectional view showing the exemplary horizontal axis test circuit portion of FIG. 16, taken along line XVII-XVII.
Figure 18:
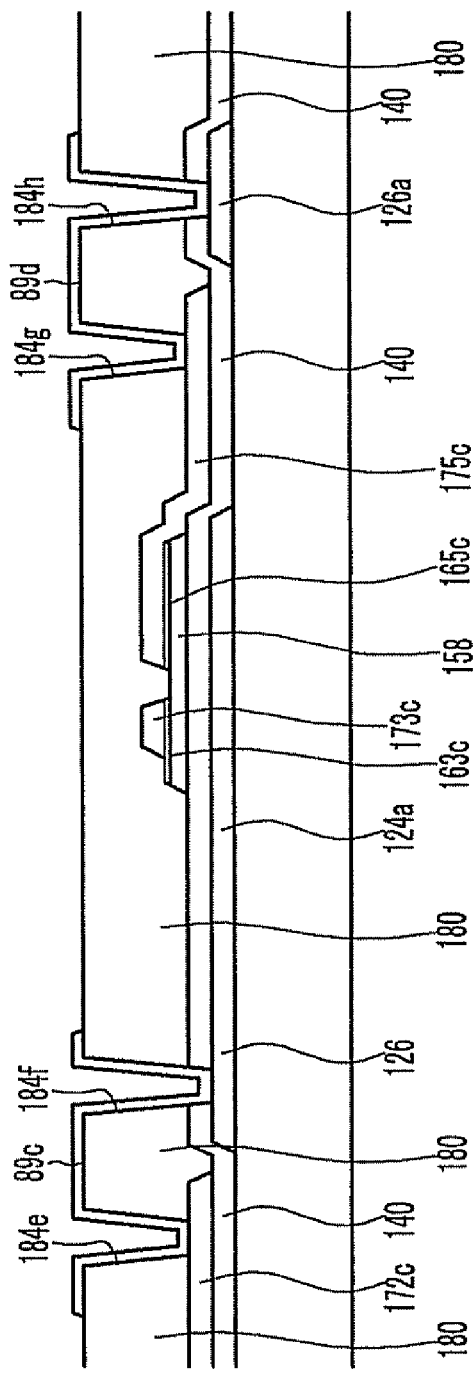
FIG. 18 is a cross-sectional view showing the exemplary horizontal axis test circuit portion of FIG. 16, taken along line XVIII-XVIII.

FIG. 10 is a layout view of portion EA1 of the exemplary LCD of FIG. 7, and FIG. 11 is a cross-sectional view of the exemplary LCD of FIG. 10, taken along line XI-XI. FIG. 12 is a layout view of portion EA2 of the exemplary LCD of FIG. 7, and FIG. 13 is a cross-sectional view of the exemplary LCD of FIG. 12, taken along line XIII-XIII. FIG. 14 is a layout view showing an exemplary vertical axis test circuit portion of an exemplary LCD according to an exemplary embodiment of the present invention, and FIG. 15 is a cross-sectional view of the exemplary vertical axis test circuit portion of FIG. 14, taken along line XV-XV. FIG. 16 is a layout view showing an exemplary horizontal axis test circuit portion of the exemplary LCD according to an exemplary embodiment of the present invention, FIG. 17 is a cross-sectional view showing the exemplary horizontal axis test circuit portion of FIG. 16, taken along line XVII-XVII, and FIG. 18 is a cross-sectional view showing the exemplary horizontal axis test circuit portion of FIG. 16, taken along line XVIII-XVIII.

As described above, the LCD according to an exemplary embodiment of the present invention includes the TFT array panel 100, the common electrode panel 200 facing the TFT array panel 100, and the liquid crystal layer 3 injected there between. As described above with reference to FIG. 7, the TFT array panel 100 is divided into a portion where a plurality of pixels PX or the like are formed (hereinafter, referred to as "pixel portion"), the vertical axis test circuit unit XUp connected to pluralities of the data lines $D_1$ to $D_m$ and the vertical sensing data lines $SX_1$ to $SX_M$, and the horizontal axis test circuit unit YUq connected to pluralities of the image scanning lines $G_1$ to $G_n$ and the horizontal sensing data lines $SY_1$ to $SY_N$, etc. First, the pixel portion of the TFT array panel 100, that is, the lower panel, will be described.

A plurality of image scanning lines 121, a plurality of horizontal sensing data lines 126, a plurality of dummy horizontal sensing data lines (not shown), a plurality of storage electrode lines 131, and a plurality of island-shaped light blocking members 135a to 135c are formed on the insulation substrate 110, the substrate 110 made of a material such as transparent glass or plastic.

The image scanning lines 121 transmit image scan signals, and are arranged substantially in the horizontal direction, a first direction. Each image scanning line 121 includes a plurality of gate electrodes 124 protruding upward, that is, protruding inwardly towards its associated pixel region. For connecting the plurality of gate electrodes 124 to another layer or an external driving circuit, each of the image scanning lines 121 includes an end portion (not shown) having a wide area.

The horizontal sensing data lines 126 transmit sensing data signals, and are arranged parallel to the image scanning lines 121. Each horizontal sensing data line 126 includes an extension 127 extending in the vertical direction, a second direction, by a predetermined length, and the extension 127 includes an end portion having a wide area. The number of extensions 127 extending from each horizontal sensing data line 126 depends on the number of sensing units provided in the LCD.

The dummy horizontal sensing data lines are arranged parallel to the image scanning lines 121, and are formed between dots where the horizontal sensing data lines 126 are not formed.

Each storage electrode line 131 is supplied with a predetermined voltage such as the common voltage Vcom, and includes a plurality of stem lines 131a arranged almost parallel to the image scanning lines 121, a plurality of extensions 134 protruding upward from the stem lines 131a, and a plurality of first to third protrusions 133a to 133c that are split from the extensions 134 and the stem lines 131a and extend upward by a predetermined distance and that prevent light leakage. The first to third protrusions 133a to 133c may end prior to the horizontal sensing data lines 126. The first and second protrusions 133a and 133b are adjacent to each other while being spaced apart by a predetermined distance. Further, they extend for a predetermined distance, are then slantedly and inwardly curved, and then extend upward for a predetermined distance. Spaces formed between the first and second protrusions 133a and 133b function as portions for forming the sensing units SU, in which the vertical axis and horizontal axis sensing units SU are formed. The extensions 127 of the horizontal sensing data lines 126 are located within the portions for forming the sensing units SU. That is, the extensions 127 extend between the spaces formed between the first and second protrusions 133a and 133b.

The horizontal widths of the first and second protrusions 133a and 133b may be almost the same, and may be smaller than that of the third protrusion 133c.

The island-shaped light blocking members 135a to 135c prevent light leakage. A first island-shaped light blocking member 135a has a substantially rectangular shape that is long in the vertical direction and ends adjacent to the first protrusion 133a with the horizontal sensing data line 126 being sandwiched there between. A second island-shaped light blocking member 135b ends adjacent to the second protrusion 133b in the vertical direction with the horizontal sensing data line 126 being sandwiched there between. A third island-shaped light blocking member 135c ends adjacent to the third protrusion 133c in the vertical direction with the horizontal sensing data line 126 being sandwiched there between. The horizontal widths of the first and second light blocking members 135a and 135b may be almost the same, and may be less than that of the third light blocking member 135c.

The image scanning lines 121, the horizontal sensing data lines 126, the storage electrode lines 131, and the island-shaped light blocking members 135a to 135c may be made of an aluminum-containing metal such as aluminum Al or an aluminum alloy, a silver-containing metal such as silver Ag or a silver alloy, a copper-containing metal such as copper Cu or a copper alloy, a molybdenum-containing metal such as molybdenum Mo or a molybdenum alloy, chromium Cr, tantalum Ta, or titanium Ti. However, the above lines and members may have a multilayered structure including two conductive layers (not shown) having different physical characteristics. In order to reduce a signal delay or a voltage drop, one of the conductive layers may be made of a metal having low resistivity such as an aluminum-containing metal, a silver-containing metal, or a copper-containing metal, while other conductive layers within a multilayered structure may be made of a different material having excellent physical, chemical, and electrical contact characteristics, in particular with respect to ITO and IZO, such as a molybdenum-containing metal, chromium, tantalum, or titanium. Good examples thereof may include, but are not limited to, a combination of a chromium lower layer and an aluminum (alloy) upper layer, and a combination of an aluminum (alloy) lower layer and a molybdenum (alloy) upper layer. While particular embodiments have been described, it would be within the scope of these embodiments to provide a variety of metals or conductors for the plurality of image scanning lines 121, the plurality of horizontal sensing data lines 126, the plurality of storage electrode lines 131, and the plurality of island-shaped light blocking members 135a to 135c.

Lateral surfaces of the plurality of image scanning lines 121, the plurality of horizontal sensing data lines 126, the plurality of storage electrode lines 131, and the plurality of island-shaped light blocking members 135a to 135c are inclined against the surface of the substrate 110, and an inclination angle thereof is preferably in the range of about 30° to about 80°.

A gate insulating layer 140 made of, for example, silicon nitride (SiNx) or silicon oxide (SiOx), is formed on the image scanning lines 121, the horizontal sensing data lines 126, the storage electrode lines 131, the island-shaped light blocking members 135a to 135c, and other exposed surfaces of the insulating substrate 110.

A plurality of semiconductor islands 154 made of, for example, hydrogenated a-Si or polysilicon are formed on the gate insulating layer 140. The semiconductors 154 are located on the gate electrodes 124, with the gate insulating layer 140 disposed there between.

A plurality of ohmic contact islands 163 and 165 are formed on the semiconductors 154.

The ohmic contact islands 163 and 165 may be made of a material such as n+ hydrogenated a-Si in which an n-type impurity is doped with high concentration, or may be made of silicide. The ohmic contact islands 163 and 165 are disposed in pairs on the semiconductors 154. The semiconductors 154 and the lateral surface of the ohmic contact islands 163 and 165 are also inclined against the surface of the substrate 110, and an inclination angle thereof is in the range of about 30° to about 80°.

A plurality of image data lines 171, a plurality of drain electrodes 175, a plurality of vertical sensing data lines 174, and a plurality of dummy vertical sensing data lines 174a (shown in FIG. 12) are formed on the ohmic contact islands 163 and 165 and the gate insulating layer 140. The image data lines 171 transmit image data signals, and are arranged substantially in the vertical direction so as to cross the image scanning lines 121, the horizontal sensing data lines 126, the dummy horizontal sensing data lines, and the storage electrode lines 131. Each image data line 171 is arranged in the vertical direction along a curved portion of the protrusions 133b of the storage electrode line 131. Further, each image data line 171 includes a plurality of light blocking extensions that are widened at the cross-section area and widely cover these elements, a plurality of source electrodes 173 being arranged toward the gate electrode 124, and an end portion (not shown) having a wide area.

The drain electrode 175 is separated from the image data line 171, and faces the source electrode 173 with respect to the gate electrode 124. Each drain electrode 175 includes one wide edge having an extension 177, and another edge having a bar shape. The extension 177 overlaps the extension 134 of the storage electrode line 131, and the bar-shaped edge of the drain electrode 175 is surrounded by the curved source electrode 173.

One gate electrode 124, one source electrode 173, and one drain electrode 175 constitute one TFT along with the semiconductor 154. A channel of the TFT is formed on the semiconductor 154 between the source electrode 173 and the drain electrode 175. The TFT functions as the switching element Q.

The vertical sensing data lines 174 transmit sensing data signals, and are arranged substantially in the vertical direction so as to cross the image scanning lines 121, the horizontal sensing data lines 126, the dummy horizontal sensing data lines, and the storage electrode lines 131. Each vertical sensing data line 174 is closely formed to the left side of the image data line 171, and is arranged in the vertical direction along the curved portion of the protrusions 133a of the storage electrode line 131. In other words, the image data line 171 is formed on a right side of the second protrusion 133b while the vertical sensing data line 174 is formed on a left side of the second protrusion 133b. First extension 176a having substantially a rectangular shape and second extensions 176b having substantially a square shape are included in the vertical sensing data lines 174 between the two adjacent protrusions 133a and 133b of the storage electrode line 131. The first and second extensions 176a and 176b are located within the portions forming the sensing units SU.

The vertical sensing data line 174 includes a plurality of light blocking extensions of which widths are widened near a region where the image scanning lines 121, the horizontal sensing data lines 126, the horizontal sensing data lines, and the storage electrode lines 131 are crossed with one another, thereby covering these elements. The dummy vertical sensing data lines 174a (shown in FIG. 12) are arranged parallel to the image data lines 171, and are formed between dots where the vertical sensing data lines 174 are not formed. Further, the dummy vertical sensing data lines 174a are arranged in the vertical direction along the curved portion of the protrusions 133a of the storage electrode lines 131. Each dummy vertical sensing data line 174a further includes extensions for blocking light between the two adjacent protrusions 133a and 133b, so that a luminance difference between a dot where the first and second extensions 176a and 176b are formed and the rest of dots can be compensated.

The image data lines 171, the drain electrodes 175, the vertical sensing data lines 174, and the dummy vertical sensing data lines 174a are preferably made of a refractory metal such as molybdenum, chromium, tantalum, or titanium, or their alloys, and may have a multilayered structure including a refractory metal layer (now shown) and a low resistance conductive layer (not shown). Examples of the multilayered structure include a double-layered structure of a chromium or molybdenum (alloy) lower layer and an aluminum (alloy) upper layer, and a triple layered structure of a molybdenum (alloy) lower layer, an aluminum (alloy) middle layer, and a molybdenum (alloy) upper layer. While particular embodiments are disclosed, the data lines 171, the drain electrodes 175, the vertical sensing data lines 174, and the dummy vertical sensing data lines 174a may be made of various other metals or conductors.

Further, the lateral surfaces of the image data lines 171, the drain electrodes 175, the vertical sensing data lines 174, and the dummy vertical sensing data lines 174a are also preferably inclined against the surface of the substrate 110 by an inclination angle in the range of about 30° to about 80°.

The ohmic contact islands 163 and 165 are present only between the semiconductors 154 there under and the data lines 171 and the drain electrodes 175, which are disposed thereon, so as to reduce contact resistance there between. The semiconductor islands 154 have exposed portions that are not covered by the data lines 171 and the drain electrodes 175 in addition to the portions between the source electrodes 173 and the drain electrodes 175.

A plurality of semiconductor islands are formed where the image scanning lines 121, the horizontal sensing data lines 126, the dummy horizontal sensing data lines, and the storage electrode lines 131 are crossed with the image data lines 171, the vertical sensing data lines 174, and the dummy vertical sensing data lines 174a, so as to smooth a surface profile, thereby protecting the image data lines 171, the vertical sensing data lines 174, and the dummy vertical sensing data lines 174a from electrical short circuits. A passivation layer 180 is formed on the image data lines 171, the drain electrodes 175, the vertical sensing data lines 174, the dummy sensing data lines 174a, the exposed semiconductors 154, and other exposed areas of the gate insulating layer 140. The passivation layer 180 is made of an inorganic insulator or an organic insulator, and its surface may be flat. Examples of the inorganic insulator include, but are not limited to, silicon nitride and silicon oxide. The organic insulator may have photosensitivity, and its dielectric constant is preferably about 4.0 or less. The passivation layer 180 may have a double-layered structure composed of a lower inorganic layer and an upper organic layer so that exposed portions of the semiconductors 154 are not damaged by the inorganic layer, while the excellent insulating characteristic of the organic layer is maintained.

A plurality of contact holes 187 and 186 are formed through the passivation layer 180 such that the extensions 177 of the drain electrodes 175, and the first extensions 176a of the vertical sensing data lines 174, are respectively exposed. A plurality of contact holes 188 are formed through the passivation layer 180 and the gate insulating layer 140 such that at least portions of the extensions 127 of the horizontal sensing data lines 126 are exposed.

The plurality of pixel electrodes 191 and pluralities of first and second contact members 86 and 88 are formed on the passivation layer 180. These elements may be made of a transparent conductive material such as ITO or IZO, or a reflective metal such as aluminum, silver, chromium, or their alloys.

The pixel electrodes 191 are physically and electrically connected to the drain electrodes 175 via the contact holes 187, and are supplied with image data voltages from the drain electrodes 175. Each pixel electrode 191 supplied with the image data voltage generates an electric field along with the common electrode panel 200 receiving the common voltage Vcom, thereby determining orientations of the liquid crystal molecules of the liquid crystal layer 3 between the electrodes 191 and 270. According to the orientation of the liquid crystal molecules determined in this manner, light passing through the liquid crystal layer 3 is differently polarized. Each pixel electrode 191 and the common electrode 270 constitute a liquid crystal capacitor Clc, which maintains a supplied voltage even after the TFT is turned off.

Each pixel electrode 191, and the extension 177 of the drain electrodes 175 connected to the pixel electrode 191 overlap the extension 134 of the storage electrode line 131, thereby constituting a storage capacitor Cst. The storage capacitor Cst increases a voltage sustaining ability of the liquid crystal capacitor Clc. The pixel electrodes 191 may overlap the image data lines 171, the vertical sensing data lines 174, and the dummy vertical sensing data lines 174a so as to enhance an aperture ratio.

The first contact members 86 almost entirely cover the first extensions 176a of the vertical sensing data lines 174, and are physically and electrically connected to the first extensions 176a via the contact holes 186. The second contact members 88 almost entirely cover the second extensions 176b of the vertical sensing data lines 174 and the wide edge portions of the extensions 127 of the horizontal sensing data lines 126 having the contact holes 188 formed thereon, and are physically and electrically connected to the horizontal sensing data lines 126 via the contact holes 188.

Now, the vertical axis test circuit unit of the TFT array panel 100 will be described.

As shown in FIG. 14 and FIG. 15, a first vertical axis test line 123 and a second vertical axis test line 128, that are formed within a same layer of the LCD as the image scanning lines 121, are formed on the insulation substrate 110.

The first vertical axis test line 123 transmits the first vertical axis test signal, and is arranged substantially in the horizontal direction, and may be substantially parallel to the image scanning lines 121. The first vertical axis test line 123 includes a plurality of protrusions 125 protruding downwardly from the first vertical axis test line 123. The protrusions 125 are formed for each vertical axis test circuit. For connecting the plurality of protrusions 125 to another layer or an external driving circuit, the first vertical axis test line 123 may include an end portion (not shown) having a wide area.

The second vertical axis test line 128 transmits the second vertical axis test signal, and is arranged substantially parallel to the first vertical axis test line 123. The second vertical axis test line 128 includes gate electrodes 128a that protrude upwardly from the second vertical axis test line 128, and the gate electrodes 128a are formed for each vertical axis test circuit unit. The second vertical axis test line 128 also includes vertical stem portions 128b extending in the vertical direction, horizontal stem portions 128c that are connected to the vertical stem portions 128b and extend in the horizontal direction, and gate electrodes 128d that are formed between the two adjacent vertical stem portions 128b and protrude upward from the horizontal stem portions 128c. Further, the second vertical axis test line 128 may include an end portion (not shown) having a wide area for connecting the second vertical axis test line 128 and its portions with another layer or an external driving circuit.

The lateral surfaces of the first vertical axis test line 123 and the second vertical axis test line 128 are inclined against the surface of the substrate 110, and an inclination angle thereof is preferably in the range of about 30° to about 80°.

The gate insulating layer 140 is formed on the first vertical axis test line 123 and the second vertical axis test line 128. A plurality of semiconductor islands 155 and 156 are formed on the gate insulating layer 140.

The semiconductor islands 155 are formed on the gate electrodes 128a, and the semiconductor islands 156 are formed on the gate electrodes 128d. The semiconductors 155 and 156 are formed with ohmic contact islands 163a, 163b, 165a, and 165b. The ohmic contact islands 163a and 165a are formed on the semiconductor island 155. The ohmic contact islands 163b and 165b are formed on the semiconductor island 156. The lateral surfaces of the semiconductor islands 155 and 156 and the ohmic contact islands 163a, 163b, 165a, and 165b are also inclined against the surface of the substrate 110, and an inclination angle thereof is in the range of about 30° to about 80°.

Source electrodes 173a, vertical sensing signal output lines 172 connected to the vertical sensing data lines 174, and a plurality of drain electrodes 175b respectively connected to image data lines 171 are formed on the exposed portions of semiconductors 155 and 156, the ohmic contact islands 163a, 163b, 165a, and 165b, and the gate insulating layer 140. These elements 173a, 172, and 175b are formed within a same layer of the LCD as the image data lines 171 and the vertical sensing data lines 174. Each source electrode 173a includes a wide edge portion and a bar-shaped portion arranged toward the gate electrode 128a.

Each vertical sensing signal output line 172 is connected to a vertical sensing data line 174, and includes a drain electrode 175a facing the source electrode 173a with respect to the gate electrode 128a, and further includes a source electrode 173b formed on each gate electrode 128d. For forming the drain electrode 175a, the vertical sensing signal output line 172 includes a vertical portion extending substantially parallel to the vertical sensing data line 174 and the drain electrode 175a extends substantially perpendicular from the vertical portion. For forming the source electrode 173b on each gate electrode 128d, the vertical sensing signal output line 172 includes a line for a respective image line group substantially parallel to the horizontal stem portion 128c, and a stem extending towards each gate electrode 128d. The stem of the vertical sensing signal output line 172 is then divided into two branches, and surrounds each corresponding bar-shaped drain electrode 175b. Each vertical sensing signal output line 172 may include an end portion (not shown) having a wide area for connection with another layer or an external driving circuit.

One gate electrode 128a, one source electrode 173a, and one drain electrode 175a constitute one TFT along with the semiconductor 155. The channel of the TFT is formed in the semiconductor 155 between the source electrode 173a and the drain electrode 175a. The TFT functions as the transistor $DT_p$.

In addition, one gate electrode 128d, one source electrode 173b, and one drain electrode 175b constitute one TFT along with the semiconductor 156. The channel of the TFT is formed in the semiconductor 156 between the source electrode 173b and the drain electrode 175b. This TFT functions as one of the transistors $DT_{p1}$ to $DT_{p6}$.

The lateral surfaces of the source electrodes 173a and 173b, the vertical sensing signal output lines 172, and the drain electrodes 175b are also inclined against the surface of the substrate 110 by an inclination angle in the range of about 30° to about 80°.

As described above, the ohmic contact islands 163a, 163b, 165a, and 165b are present only between the underlying semiconductors 155 and 156 and the overlying conductors 173a, 175a, 173b, and 175b thereon, and serve to reduce contact resistance there between.

A plurality of semiconductor islands are formed where the first vertical axis test line 123 and the second vertical axis test line 128 are crossed with the source electrodes 173a, vertical sensing signal output lines 172, and the plurality of drain electrodes 175b, so as to smooth a surface profile thereof, thereby protecting the source electrodes 173a, the vertical sensing signal output lines 172, and the plurality of drain electrodes 175b from electrical short circuits.

The passivation layer 180 is formed on the source electrodes 173a, the vertical sensing signal output lines 172, the drain electrodes 175*b*, the exposed semiconductors 155 and 156, and the gate insulating layer 140.

A plurality of contact holes 185*b* for exposing the source electrodes 173*a* are formed through the passivation layer 180, and a plurality of contact holes 185*a* for exposing the protrusions 125 of the first vertical axis test line 123 are formed through the passivation layer 180 and the gate insulating layer 140.

A plurality of connecting members 89, that are formed within a same layer of the LCD as the pixel electrodes 191, are formed on the passivation layer 180.

Each connecting member 89 connects the protrusion 125 of the first vertical axis test line 123 to the source electrode 173*a* via the contact holes 185*a* and 185*b*.

Now, the horizontal axis test circuit portion of the TFT array panel 100 will be described.

As shown in FIG. 16, FIG. 17, and FIG. 18, the TFT array panel 100 is formed with horizontal sensing signal output lines 122 and island-shaped gate electrodes 124*a* and 124*b* that are formed on the insulating substrate 110 within a same layer of the TFT array panel 100 as the image scanning lines 121.

Each horizontal sensing signal output line 122 is connected to a horizontal sensing data line 126, and includes a protrusion 126*a* protruding to the left side and a protrusion 126*b* protruding to the right side, in an exemplary embodiment. Further, the horizontal sensing signal output line 122 may include an end portion (not shown) having a wide area for connection with another layer or an external driving circuit. The gate electrodes 124*a* may have rectangular shapes, and are formed for each horizontal axis test circuit, respectively. End portions of the gate electrodes 124*b* widely expand in the horizontal direction.

The lateral surfaces of the horizontal sensing signal output lines 122 and the gate electrodes 124*a* and 124*b* are inclined against the surface of the substrate 110, and an inclination angle thereof is preferably in the range of about 30° to about 80°.

The gate insulating layer 140 is formed on the horizontal sensing signal output lines 122 and the gate electrodes 124*a* and 124*b*. Pluralities of semiconductor islands 158 and 159 are formed on the gate insulating layer 140.

Each semiconductor island 158 is formed on the gate electrode 124*a*, and each semiconductor island 159 is formed on the gate electrode 124*b*.

Ohmic contact islands 163*c*, 163*d*, 165*c*, and 165*d* are formed on the semiconductors 158 and 159. The ohmic contact islands 163*c* and 165*c* are formed on the semiconductor islands 158, and the ohmic contact islands 163*d* and 165*d* are formed on the semiconductor islands 159.

The lateral surfaces of the semiconductors 158 and 159 and the ohmic contact islands 163*c*, 163*d*, 165*c*, and 165*d* are also inclined against the surface of the substrate 110, and an inclination angle thereof is in the range of about 30° to about 80°.

A first horizontal axis test line 172*a*, a second horizontal axis test line 172*b*, source electrodes 173*d*, and drain electrodes 175*c* and 175*d* are formed on the exposed portions of the semiconductors 158 and 159, the ohmic contact islands 163*c*, 163*d*, 165*c*, and 165*d*, and the gate insulating layer 140. The elements 172*a*, 172*b*, 175*c*, and 175*d* are formed within a same layer of the TFT array panel 100 as the image data lines 171.

The first horizontal axis test line 172*a* transmits the first horizontal axis test signal, and is arranged substantially in the horizontal direction. The first horizontal axis test line 172*a* includes source electrodes 173*c* facing the respective drain electrodes 175*c*. Further, the first horizontal axis test line 172*a* may include an end portion (not shown) having a wide area for connection with another layer or an external driving circuit.

The second horizontal axis test line 172*b* transmits the second horizontal axis test signal, and is arranged almost parallel to the first horizontal axis test line 172*a*. The second horizontal axis test line 172*b* includes protrusions 172*c* protruding upward towards the first horizontal axis test line 172*a*, vertical stem portions 172*d* extending in the vertical direction, in this case parallel to the image scanning lines 121, and horizontal stem portions 172*e* which are formed between the adjacent vertical stem portions 172*d*, respectively and extend in the horizontal direction, in this case parallel to the image data lines 171.

The second horizontal axis test line 172*b* may further include an end portion (not shown) having a wide area for connection with another layer or an external driving circuit. Each source electrode 173*d* includes a stem portion arranged in the horizontal direction, a plurality of extensions extending downwardly from the stem portion, each having a rectangular shaped portion protruding therefrom, and each source electrode 173*d* further includes a rectangular shaped protrusion protruding downwardly from the stem portion.

The drain electrode 175*c* faces the source electrode 173*c* with respect to the gate electrode 124*a*, and includes a wide end portion. The drain electrode 175*d* faces the portion of the extension of the source electrode 173*d* over the gate electrode 124*b*, and includes a wide end portion.

One gate electrode 124*a*, one source electrode 173*c*, and one drain electrode 175*c* constitute one TFT along with the semiconductor 158. The channel of the TFT is formed in the semiconductor 158 between the source electrode 173*c* and the drain electrode 175*c*. The TFT functions as the TFT $GT_q$.

One gate electrode 124*b*, one source electrode 173*d*, and one drain electrode 175*d* constitute one TFT along with the semiconductor 159. The channel of the TFT is formed on the semiconductor 159 between the source electrode 173*d* and the drain electrode 175*d*. The TFT functions as one of the TFTs $GT_{q1}$ to $GT_{q6}$.

The lateral surfaces of the first horizontal axis test line 172*a*, the second horizontal axis test line 172*b*, the source electrodes 173*d*, and the drain electrodes 175*c* and 175*d* are also inclined against the surface of the substrate 110, preferably at an inclination angle in the range of about 30° to about 80°. As described above, the ohmic contact islands 163*c*, 163*d*, 165*c*, and 165*d* are present only on the underlying semiconductors 158 and 159 and beneath the overlying conductors 173*c*, 175*c*, 173*d*, and 175*d* thereon.

A plurality of semiconductor islands are formed where the horizontal sensing signal output lines 122 and the island-shaped gate electrodes 124*a* and 124*b* are crossed with the first horizontal axis test line 172*a*, the second horizontal axis test line 172*b*, the source electrodes 173*d*, and the drain electrodes 175*c* and 175*d*, so as to smooth a surface profile thereof, thereby protecting the first horizontal axis test line 172*a*, the second horizontal axis test line 172*b*, the source electrodes 173*d*, and the drain electrodes 175*c* and 175*d* from electrical short circuits.

The passivation layer 180 is formed on the first horizontal axis test line 172*a*, the second horizontal axis test line 172*b*, the source electrodes 173*d*, the drain electrodes 175*c* and 175*d*, the exposed semiconductors 158 and 159, and the gate insulating layer 140.

Contact holes 184*g*, 184*c*, 184*e*, and 184*a* respectively exposing the drain electrodes 175*c* and 175*d*, the protrusions 172*c*, and the protrusions of the source electrodes 173*d* are formed through the passivation layer 180. Contact holes 184f, 184i, 184h, 184b, and 184d respectively exposing the gate electrodes 124a and 124b, the protrusions 126a and 126b, and the image scanning lines 121 are formed through the passivation layer 180 and the gate insulating layer 140.

Connecting members 89a, 89b, 89c, 89d, and 89e, formed within a same layer of the TFT array panel 100 as the pixel electrodes 191 or the like, are formed on the passivation layer 180.

Each connecting member 89a connects the protrusion of the source electrode 173d to the protrusion 126b of the horizontal sensing signal output line 122 via the contact holes 184a and 184b.

Each connecting member 89b connects the electrode 175d to the image scanning lines 121 via the contact holes 184c and 184d.

Each connecting member 89c connects the gate electrode 124a to the protrusion 172c of the second horizontal axis test line 172b via the contact holes 184f and 184e. Further, each connecting member 89d connects the protrusion 126a of the horizontal sensing signal output line 122 to the drain electrode 175c via the contact holes 184h and 184g.

Each connecting member 89e connects the horizontal stem portion 172e of the second horizontal axis test line 172b to the gate electrode 124b via the contact hole 184i.

Now, the structure of the common electrode panel 200 will be further described.

As described above with reference to FIG. 5, and with further reference to FIG. 11 and FIG. 13, in the common electrode panel 200, a light blocking member 220 also known as a black matrix is formed on the insulating substrate 210 made of transparent glass or plastic. The light blocking member 220 faces the pixel electrodes 191, includes a plurality of openings having almost the same shape as the pixel electrodes 191, and blocks light leakage between the pixel electrodes 191. The light blocking member 220 may be composed of a portion corresponding to the image scanning lines 121, the horizontal sensing data lines 126, the dummy horizontal sensing data lines, the image data lines 171, the vertical sensing data lines 174, and the dummy vertical sensing data lines 174a, and a portion corresponding to the TFT.

The plurality of color filters 230 are formed on the substrate 210.

The color filters 230 are mostly present in the region surrounded by the light blocking member 220, and can be arranged in one direction. Each color filter 230 may present any one of colors such as red, green, and blue.

An overcoat 250 including the sensing protrusions 245 is formed on the color filter 230 and the light blocking member 220. The overcoat 250 may be made of an (organic) insulating material, and it prevents the color filter 230 from being exposed and provides a flat surface.

Each sensing protrusion 245 includes a first sensing protrusion 245a facing the first contact member 86 formed on the TFT array panel 100, and a second sensing protrusion 245b facing the second ohmic contact member 88 formed on the TFT array panel 100.

The first and second sensing protrusions 245a and 245b are disposed so as to be respectively included within an area projection occupied by the first and second extensions 176a and 176b of the vertical sensing data line 174 formed on the TFT array panel 100.

The common electrode 270 is formed on the overcoat 250. The common electrode 270 is made of a transparent conductor such as ITO or IZO.

An alignment layer is applied over the inner surfaces of the display panels 100 and 200. At least one polarizer is provided on the outer surfaces of the display panels 100 and 200.

The LCD may further include a sealant (not shown) for bonding the lower panel 100 and the upper panel 200 together. The sealant may be located at an edge of the upper panel 200.

The common electrode 270 surrounding one first sensing protrusion 245a and one first contact member 86 form a switch SWT of the vertical axis sensing unit. When the common electrode 270 and the first contact member 86 are brought into contact with each other by an external pressure, the common voltage Vcom supplied through the common electrode 270 is transmitted to the vertical sensing data line 174 via the first extension 176a.

Further, the common electrode 270 surrounding one second sensing protrusion 245b and one second ohmic member 88 form a switch SWT of the horizontal axis sensing unit. When the common electrode 270 and the second ohmic contact member 88 are brought into contact with each other by an external pressure, the common voltage Vcom supplied through the common electrode 270 is transmitted to the horizontal sensing data line 126 via the extension 127.

The overcoat 250 may be optionally omitted. In this case, the sensing protrusions 245a and 245b may be formed on the light blocking member 220 or the color filter 230.

The above-described structure may be manufactured using five masks according to an embodiment of the present invention, or may employ a structure in which three or four masks are used.

In exemplary embodiments of the present invention, a pressure sensing unit has been described as a sensing unit, but the present invention is not limited thereto. Thus, the present invention may employ a sensing unit using a variable capacitor of which capacitance varies depending on externally imposed pressure, or an optical sensor of which an output signal varies depending on light intensity. In addition, the display device of the present invention includes two or more types of sensing units, thereby improving accuracy in contact determination.

Furthermore, although the LCD has been described as a display device according to an embodiment of the present invention, the present invention is not limited thereto. Thus, the same will also apply to a display device such as a plasma display device or an organic light emitting diode ("OLED") display.

According to the present invention, a test result of an embedded sensing unit is checked by using a display unit of a display device. As a result, additional equipment for checking a test result is not necessary, and a test operation is thereby easily carried out, increasing test efficiency. In addition, a test cost decreases.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a plurality of first display signal lines;
a plurality second display signal lines crossing the first display signal lines;

a plurality of pixels each respectively connected to one of the first display signal lines and one of the second display signal lines;

a plurality of first sensing signal lines, each respectively formed substantially parallel to a subset of the first display signal lines, each subset of first display signal lines forming a first display signal group;

a plurality of second sensing signal lines, each respectively formed substantially parallel to a subset of the second display signal lines, each subset of second display signal lines forming a second display signal group;

a plurality of first sensing units connected to the first sensing signal lines;

a plurality of second sensing units connected to the second sensing signal lines;

a plurality of first test circuits, each respectively connected to one of the first sensing signal lines and a corresponding one of the first display signal groups, the first test circuits supplied with first and second test signals, the first test circuits testing a state of the first sensing units by changing luminance of the pixels according to the state of the first sensing units; and a plurality of second test circuits, each respectively connected to one of the second sensing signal lines and a corresponding one of the second display signal groups, the second test circuits supplied with third and fourth test signals, the second test circuits testing a state of the second sensing units by determining whether or not the pixels will operate according to the state of the second sensing units.

2. The display device of claim 1, wherein each first test circuit comprises:
a plurality of first switching elements respectively connected to one of the first display signal line groups, and of which an operation status changes in response to the first test signals; and
a second switching element connected to the plurality of first switching elements and one of the first sensing signal lines, the second switching element operating in response to the first test signals, and supplying a voltage of the second test signal to a pixel connected to the first display signal line group connected to the plurality of first switching elements.

3. The display device of claim 2, wherein each second test circuit comprises:
a plurality of third switching elements respectively connected to one of the second display signal line groups, and of which an operation status changes in response to the third test signal; and
a fourth switching element connected to the plurality of third switching elements and one of the second sensing signal lines, the fourth switching element operating in response to the third test signals, and supplying a voltage of the fourth test signal to a pixel connected to the second display signal line group connected to the plurality of third switching elements.

4. The display device of claim 3, wherein the first and third test signals are gate-on voltages.

5. The display device of claim 4, wherein the second test signal is a data voltage presenting a black gray.

6. The display device of claim 4, wherein the fourth test signal is a gate-on voltage.

7. The display device of claim 3, wherein the first and second test circuits are formed in an edge region of the display device.

8. The display device of claim 1, wherein the first and second sensing units are pressure sensors.

9. A display device comprising:
a plurality of first display signal lines;
a plurality of second display signal lines crossing the first display signal lines;
a plurality of pixels each respectively connected to one of the first display signal lines and one of the second display signal lines;
a plurality of first sensing signal lines, each respectively formed substantially parallel to a subset of the first display signal lines;
a plurality of second sensing signal lines, each respectively formed substantially parallel to a subset of the second display signal lines;
a first test line spaced apart from a pixel, and transmitting a first test signal;
a second test line spaced apart from the first test line, and transmitting a second test signal;
a first switching element connected to the first test line, the second test line, and one of the first sensing signal lines;
a plurality of second switching elements connected to one subset of the first display signal lines adjacent to the first switching element, the second test line, and the first sensing signal line connected to the first switching element;
a third test line spaced apart from the pixel, and transmitting a third test signal;
a fourth test line spaced apart from the third test line, and transmitting a fourth test signal;
a third switching element connected to the third test line, the fourth test line, and one of the second sensing signal lines; and
a plurality of fourth switching elements connected to one subset of the second display signal lines adjacent to the third switching element, the fourth test line, and the second sensing signal line connected to the third switching element.

10. The display device of claim 9, further comprising a sensing unit connected to each of the first and second sensing signal lines.

11. The display device of claim 10, wherein each sensing unit is a pressure sensor.

12. The display device of claim 10, wherein pixels, corresponding to a sensing unit in an abnormal state, present a gray corresponding to a magnitude of a voltage different from a magnitude of a voltage of the first test signal.

13. The display device of claim 9, wherein the first and second test lines are formed within a same layer of the display device as the second display signal lines and the third and fourth test lines are formed within a same layer of the display device as the first display signal lines.

14. A method of testing a sensing unit of a display device, the display device including:
a plurality of first display signal lines;
a plurality second display signal lines;
a plurality of pixels each respectively connected to one of the first display signal lines and one of the second display signal lines;
at least one first sensing signal line, each first sensing signal line respectively formed substantially parallel to a subset of the first display signal lines;
at least one second sensing signal line, each second sensing signal line respectively formed substantially parallel to a subset of the second display signal lines;
a first test line;

a second test line;

a first switching element of which an input terminal is connected to the first test line, a control terminal is connected to the second test line, and an output terminal is connected to one of the at least one first sensing signal lines;

a plurality of second switching elements of which input terminals are connected to the first switching element, control terminals are connected to the second test line, and output terminals are respectively connected to one subset of first display signal lines adjacent to the first sensing signal line connected to the first switching element;

a third test line;

a fourth test line;

a third switching element of which an input terminal is connected to the third test line, a control terminal is connected to the fourth test line, and an output terminal is connected to one of the at least one second sensing signal lines; and, a plurality of fourth switching elements of which input terminals are connected to the third switching element, control terminals are connected to the fourth test line, and output terminals are respectively connected to one subset of second display signal lines adjacent to the second sensing signal line connected to the third switching element, the method comprising:

supplying a first test signal when first to second switching elements are turned on by supplying the first test signal having a first magnitude to the first test line and supplying a second test signal having a second magnitude to the second test line;

changing a state of the second test signal to a third magnitude that is less than the second magnitude;

supplying a fourth test signal to a corresponding pixel when the third to fourth switching elements are turned on by supplying a third test signal having a fourth magnitude to the third test line and supplying the fourth test signal having the second magnitude to the fourth test line; and changing a state of the fourth test signal from the second magnitude to the third magnitude.

15. The method of claim 14, wherein the second magnitude is equal to a magnitude of a gate-on voltage.

16. The method of claim 15, wherein the third magnitude is equal to a magnitude of a gate-off voltage.

17. The method of claim 16, wherein the first magnitude is equal to a data voltage presenting a black gray.

18. The method of claim 16, wherein the fourth magnitude is equal to the magnitude of the gate-on voltage.

19. The method of claim 14, further comprising supplying the first test signal to the first display signal lines via the second switching elements, and supplying the third test signal to the second display signal lines via the fourth switching elements.

20. The method of claim 14, wherein the display further includes a sensing unit connected to each of the first and second sensing signal lines, and the method further includes determining whether a sensing unit is in an abnormal state by visually detecting whether any corresponding pixels present a gray corresponding to a magnitude of a voltage different from the first magnitude.

* * * * *